United States Patent
Rostaing et al.

(10) Patent No.: US 10,523,805 B2
(45) Date of Patent: *Dec. 31, 2019

(54) ENHANCEMENTS TO DATA-DRIVEN MEDIA MANAGEMENT WITHIN AN ELECTRONIC DEVICE

(71) Applicant: Apple Inc., Cupertino, CA (US)

(72) Inventors: Andrew Rostaing, San Francisco, CA (US); Anthony J. Guetta, Palo Alto, CA (US); Greg Chapman, San Jose, CA (US)

(73) Assignee: Apple, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,344

(22) Filed: Dec. 20, 2018

(65) Prior Publication Data
US 2019/0199846 A1    Jun. 27, 2019

Related U.S. Application Data

(63) Continuation of application No. 15/652,118, filed on Jul. 17, 2017, now Pat. No. 10,187,507, which is a
(Continued)

(51) Int. Cl.
*G06F 3/00* (2006.01)
*G06F 13/00* (2006.01)
(Continued)

(52) U.S. Cl.
CPC .......... *H04M 1/72522* (2013.01); *G06F 3/00* (2013.01); *G06F 3/0484* (2013.01); *G06F 3/165* (2013.01);
(Continued)

(58) Field of Classification Search
CPC . G06F 13/00; G06F 13/10; G06F 3/00; G06F 3/07; G06F 3/16
(Continued)

(56) References Cited

U.S. PATENT DOCUMENTS 3,224,115 A    12/1965   Auemheimer
5,199,064 A     3/1993   Gulick et al.
(Continued)

FOREIGN PATENT DOCUMENTS

JP    2003309885 A    10/2003

OTHER PUBLICATIONS

Sonos CR200 Review; Thomas Ricker, Jul. 27, 2009; <http://www.engadget.com/2009/07/27/sonos-cr200-review/>.
(Continued)

*Primary Examiner* — Christopher B Shin
(74) *Attorney, Agent, or Firm* — Womble Bond Dickinson (US) LLP

(57) ABSTRACT

A centralized resource manager manages the routing of audio or visual information within a device, including a handheld device such as a smartphone. The resource manager evaluates data-driven policies to determine how to route audio or visual information to or from various input or output components connected to the device, including headphones, built-in speakers, microphones, bluetooth headsets, cameras, and so on. Among the data considered in the policies are connection status data, indicating if a device is connected, routing status data, indicating if a device is permitted to route information to or from a component, and grouping data, indicating logical relationships between various components. Components may be considered inherently routable, automatically routable, or optionally routable. Numerous other uses exist for such data, including providing simpler and more logical management interfaces.

18 Claims, 14 Drawing Sheets

|  | present? | ring tone | keypad | music |
|---|---|---|---|---|
| main speaker 104 | yes | yes | no | yes |
| headphones 112 | yes* | yes (conditional) | no | yes |
| UI speaker 124 | yes | not permitted | yes | not permitted |
| wireless 116 | no** | — | — | — |
| line-in line-out 120 | no | — | — | — |

210₁ (enabled devices and policies)

Related U.S. Application Data continuation of application No. 15/213,245, filed on Jul. 18, 2016, now Pat. No. 9,712,658, which is a continuation of application No. 14/601,041, filed on Jan. 20, 2015, now Pat. No. 9,411,495, which is a continuation of application No. 13/460,607, filed on Apr. 30, 2012, now Pat. No. 8,943,225, which is a continuation of application No. 12/405,212, filed on Mar. 16, 2009, now Pat. No. 8,171,177, which is a continuation-in-part of application No. 12/106,187, filed on Apr. 18, 2008, now Pat. No. 8,111,837, which is a continuation-in-part of application No. 11/824,320, filed on Jun. 28, 2007, now Pat. No. 8,041,438, which is a continuation-in-part of application No. 11/824,160, filed on Jun. 28, 2007, now Pat. No. 7,861,008.

(51) Int. Cl.
| | |
|---|---|
| H04M 1/725 | (2006.01) |
| G06F 16/41 | (2019.01) |
| G06F 3/16 | (2006.01) |
| H04M 1/60 | (2006.01) |
| G06F 3/0484 | (2013.01) |
| G06F 15/16 | (2006.01) |

(52) U.S. Cl.
CPC ............. *G06F 13/00* (2013.01); *G06F 15/16* (2013.01); *G06F 16/41* (2019.01); *H04M 1/6016* (2013.01); *H04M 1/72558* (2013.01)

(58) Field of Classification Search
USPC ....... 710/5–7, 36–45; 700/94; 719/322, 328, 719/329
See application file for complete search history.

(56) References Cited

U.S. PATENT DOCUMENTS

| | | | |
|---|---|---|---|
| 5,317,558 | A | 5/1994 | Yagami et al. |
| 5,930,352 | A | 7/1999 | Hiraiwa |
| 6,252,947 | B1 | 6/2001 | Diamond et al. |
| 6,389,473 | B1 | 5/2002 | Carmel et al. |
| 6,549,790 | B1 | 4/2003 | Rubbmark et al. |
| 6,560,497 | B2 | 5/2003 | Naruki et al. |
| 6,574,471 | B1 | 6/2003 | Rydbeck |
| 6,628,999 | B1 | 9/2003 | Klaas et al. |
| 6,859,845 | B2 | 2/2005 | Mate |
| 7,088,834 | B2 | 8/2006 | Takemoto et al. |
| 7,272,232 | B1 | 9/2007 | Donaldson et al. |
| 7,349,548 | B2 | 3/2008 | Wang |
| 7,415,119 | B2 | 8/2008 | Boss et al. |
| 7,561,932 | B1 | 7/2009 | Holmes et al. |
| 7,653,203 | B2 | 1/2010 | Holmi et al. |
| 7,739,723 | B2 | 6/2010 | Rogers et al. |
| 7,861,008 | B2 | 12/2010 | Batson et al. |
| 8,041,438 | B2 | 10/2011 | Batson et al. |
| 8,073,969 | B2 | 12/2011 | Littlefield et al. |
| 8,095,694 | B2 | 1/2012 | Rostaing et al. |
| 8,111,837 | B2 | 2/2012 | Guetta et al. |
| 8,140,714 | B2 | 3/2012 | Batson et al. |
| 8,171,177 | B2 | 5/2012 | Rostaing et al. |
| 8,788,080 | B1 | 7/2014 | Kallai et al. |
| 8,943,225 | B2 | 1/2015 | Rostaing et al. |
| 9,411,495 | B2 | 8/2016 | Rostaing |
| 9,712,658 | B2 | 7/2017 | Rostaing |
| 2002/0006785 | A1 | 1/2002 | Ohtsuki |
| 2002/0116541 | A1 | 8/2002 | Parker et al. |
| 2002/0164155 | A1 | 11/2002 | Mate |
| 2003/0104843 | A1 | 6/2003 | Geren et al. |
| 2003/0108003 | A1 | 6/2003 | Dietz |
| 2003/0215098 | A1 | 11/2003 | Marumoto |
| 2004/0266399 | A1 | 12/2004 | Simpson |
| 2005/0169446 | A1 | 8/2005 | Randall et al. |
| 2005/0180578 | A1 | 8/2005 | Cho et al. |
| 2006/0051053 | A1 | 3/2006 | Tamura |
| 2006/0089735 | A1 | 4/2006 | Atkinson |
| 2006/0105800 | A1 | 5/2006 | Lee |
| 2006/0168185 | A1 | 7/2006 | Robbin et al. |
| 2007/0019823 | A1 | 1/2007 | Miyazaki |
| 2007/0025335 | A1 | 2/2007 | Patel |
| 2007/0053527 | A1 | 3/2007 | Barbieri et al. |
| 2007/0093222 | A1 | 4/2007 | Kato |
| 2007/0172084 | A1 | 7/2007 | Lee |
| 2007/0203979 | A1 | 8/2007 | Walker et al. |
| 2007/0207733 | A1 | 9/2007 | Wong et al. |
| 2007/0244586 | A1 | 10/2007 | Champion |
| 2007/0283423 | A1 | 12/2007 | Bradley et al. |
| 2008/0144560 | A1 | 6/2008 | Ji et al. |
| 2008/0168185 | A1 | 7/2008 | Robbin et al. |
| 2008/0183575 | A1 | 7/2008 | Kaplan et al. |
| 2008/0186960 | A1 | 8/2008 | Kocheisen et al. |
| 2008/0187967 | A1 | 8/2008 | Doelle et al. |
| 2008/0188208 | A1 | 8/2008 | Sung |
| 2008/0240461 | A1 | 10/2008 | Nakamura et al. |
| 2008/0244050 | A1 | 10/2008 | Wong et al. |
| 2009/0003620 | A1 | 1/2009 | McKillop et al. |
| 2009/0005891 | A1 | 1/2009 | Batson et al. |
| 2009/0005892 | A1 | 1/2009 | Guetta et al. |
| 2009/0006671 | A1 | 1/2009 | Batson et al. |
| 2009/0034750 | A1 | 2/2009 | Ayoub et al. |
| 2009/0046210 | A1 | 2/2009 | Sakamoto et al. |
| 2009/0061841 | A1 | 3/2009 | Chaudhri et al. |
| 2009/0187967 | A1 | 7/2009 | Rostaing et al. |
| 2009/0262256 | A1 | 10/2009 | Asayama et al. |
| 2009/0269036 | A1 | 10/2009 | Mitani et al. |
| 2009/0322855 | A1 | 12/2009 | Abe |
| 2010/0271555 | A1 | 10/2010 | Choi et al. |
| 2011/0085679 | A1 | 4/2011 | Jakes et al. |
| 2011/0093620 | A1 | 4/2011 | Batson et al. |
| 2011/0213901 | A1 | 9/2011 | Rostaing et al. |
| 2011/0285921 | A1 | 11/2011 | Asayama et al. |
| 2011/0310308 | A1 | 12/2011 | Asayama et al. |
| 2012/0109349 | A1 | 5/2012 | Batson et al. |
| 2012/0159011 | A1 | 6/2012 | Rostaing et al. |
| 2015/0092947 | A1 | 4/2015 | Gossain et al. |

OTHER PUBLICATIONS

Restriction Requirement dated Oct. 20, 2009 for U.S. Appl. No. 11/824,160, filed Jun. 28, 2007.
Notice of Allowance dated Aug. 15, 2010 for U.S. Appl. No. 11/824,160, filed Jun. 28, 2007.
Restriction Requirement dated Sep. 20, 2010 for U.S. Appl. No. 11/824,320, filed Jun. 28, 2007.
Non-Final Office Action dated Sep. 7, 2011 for U.S. Appl. No. 12/980,277, filed Dec. 28, 2010.
Non-Final Office Action dated Jun. 22, 2011 for U.S. Appl. No. 12/405,212, filed Mar. 16, 2009.
Non-Final Office Action dated Jun. 24, 2011 for U.S. Appl. No. 12/106,187, filed Apr. 18, 2008.
Notice of Allowance dated Jun. 30, 2011 for U.S. Appl. No. 11/824,320, filed Jun. 28, 2007.
Notice of Allowance dated Nov. 10, 2011 for U.S. Appl. No. 12/106,187, filed Apr. 18, 2008.
Notice of Allowance dated Dec. 15, 2011 for U.S. Appl. No. 12/980,277, filed Dec. 28, 2010.
Samsung Cell Phone Portable Keyboard, http://www.1800mobiles.com/498410.html, Aug. 20, 2010, pp. 1-2.
Faster typinfg with external keyboards, http://www.avecmobile.com/index.php?id=226, Aug. 20, 2010, pp. 1-9.
Logitech TyepeAway Keyboard Ultra Slim Folding Kybrd for Palm, http://www.amazon.com/Logitech-TypeAway-Keyboard-Ultra-Folding/dp/B00006B9CO, Aug. 20, 2010, pp. 1-6.
Think Outside Stowaway IR Wireless Keyboard for Pocket PC and Palm OS, http://www.amazon.com/Think-Outside-Stowaway-Wireless-Keyboard/dp/B0002OKCX4, Aug. 20, 2010, pp. 1-6.
Casio, Operation Chart: Module QW-1477, Casio, Circa 2000.

| | present? | ring tone | keypad | music |
|---|---|---|---|---|
| main speaker 104 | yes | yes | no | yes |
| headphones 112 | yes* | yes (conditional) | no | yes |
| UI speaker 124 | yes | not permitted | yes | not permitted |
| wireless 116 | no** | --- | --- | --- |
| line-in line-out 120 | no | --- | --- | --- |

210₁ (enabled devices and policies)

FIG. 3A

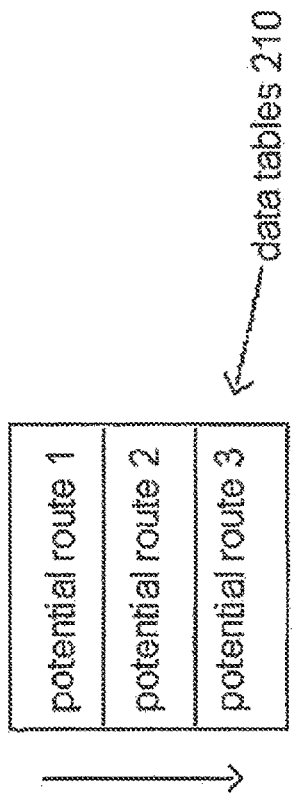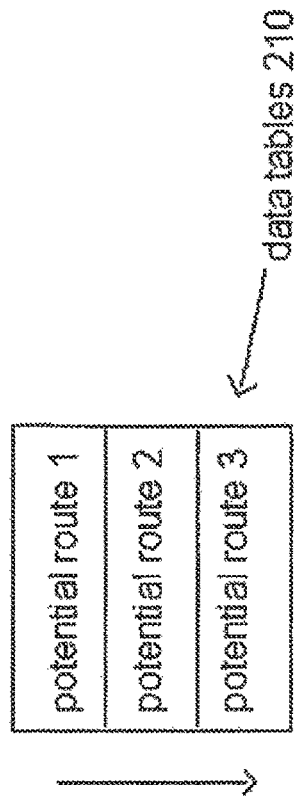
FIG. 7

| | 812 Connected? | 814 Reusable? | 816 Routable Upon Connection? | 818 Usage Policies |
|---|---|---|---|---|
| 104 Main Speaker | Yes | Yes | Inherent | ring tone, music |
| 112 Headphones | Yes | Yes | Automatic | ring tone, music |
| 124 UI Speaker | Yes | Yes | Inherent | keypad |
| 116 Wireless | Yes | No | Optionally | ring tone, music |
| 120 Line-in / Line-out | No | No | Automatic | music |

FIG. 11

| | 1122 Siblings | 1124 Partners | 1126 Last In | 1132 Music Priority | 1134 Telephone Priority | 1136 UI Priority |
|---|---|---|---|---|---|---|
| 1111 A2DP | - | HFP | 1234567890 | 1 | 4 | 2 |
| 1112 HFP | Bluetooth Microphone | A2DP | 1234567891 | 2 | 1 | 3 |
| 1113 Bluetooth Microphone | HFP | - | 1234567852 | - | 2 | - |
| 1114 Built-in Speakers | - | - | 0 | 4 | 5 | 1 |
| 1115 External Microphone | External Speaker | - | 12345668011 | - | 3 | - |
| 1116 External Speakers | External Microphone | - | 123458361 | 3 | 6 | 4 |

1110

ENHANCEMENTS TO DATA-DRIVEN MEDIA MANAGEMENT WITHIN AN ELECTRONIC DEVICE

PRIORITY CLAIM

This application is a continuation of co-pending U.S. application Ser. No. 15,652,118 filed Jul. 17, 2017, which is a continuation of Ser. No. 15/213,245 filed Jul. 18, 2016, now issued as U.S. Pat. No. 9,712,658, which is a continuation of U.S. application Ser. No. 14/601,041 filed Jan. 20, 2015, now issued as U.S. Pat. No. 9,411,495, which is a continuation of U.S. application Ser. No. 13/460,607 filed on Apr. 30, 2012, now issued as U.S. Pat. No. 8,943,225, which claims benefit under 35 U.S.C. § 120 as a Continuation of application Ser. No. 12/405,212, filed Mar. 16, 2009, now issued as U.S. Pat. No. 8,171,177, which claims benefit under 35 U.S.C. § 120 as a Continuation-In-Part of: U.S. patent application Ser. No. 12/106,187, filed on Apr. 18, 2008, now issued as U.S. Pat. No. 8,111,837, U.S. patent application Ser. No. 11/824,320 filed on Jun. 28, 2007, now issued as U.S. Pat. No. 8,041,438, and U.S. patent application Ser. No. 11/824,160 filed on Jun. 28, 2007, now issued as U.S. Pat. No. 7,861,008. The entire contents of each of which are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to routing audio within an electronic device using a variety of sources and outputs.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computing devices often process multiple types of media. The media that may be processed by computing devices often include numerous forms and formats of video, and numerous forms and formats of audio. Within such computing devices, many applications may be competing for media input or playback. Examples of the types of applications that may attempt to play or input media within a handheld computing device include, for example, a telephone application, a web browser, an e-mail application, a short message service (SMS), a music player, a video player, instant messaging (IM) application, a multimedia message service (MMS), a voice over IP (VOIP) application, and a teleconferencing application.

Within computing devices, the various software applications that utilize media all contend for use of the various input or output resources, and have different rules and protocols for doing so. Some of these rules and protocols may conflict from one application to another.

To complicate matters further, many computing devices also have multiple possible inputs and outputs for routing audiovisual information. For example, a handheld computing device may have a line-out port, a headphone port, a docking port, a microphone, a line-in port, a wireless connection, and multiple built-in speakers, each of which may serve a different function and have different capabilities.

One way to handle the contention among the applications for the playback resources of a computing device is to design each application with logic to check the state of settings of the device and decide for itself where, when, and how to play its audiovisual information. Unfortunately, using this approach, each software application developer must implement code for a behavior tree that attempts to take into account the variety of factors that can impact media processing on a device. The result may be less-than-optimal media handling decisions made by more-complex-than-necessary applications.

Further complicating the routing of audiovisual information, it may be desirable to have the information processed in specific ways under specific circumstances. For example, when music and voice audio are to be played concurrently, it may be desirable to mix the music and voice audio in a particular way. Typically, such custom treatment of specific cases would be hard-coded into the logic of the software and/or hardware components involved in the playback. Hard-coding such customizations significantly increases the complexity of a devices software and/or hardware components.

Additional complications arise when a device is connected to one or more wireless inputs or outputs, such as bluetooth headsets. While many conventional devices simply assume that audiovisual information should be routed through wireless connections whenever possible, a user may often prefer not to route audio through a connected device. For example, the user may have inadvertently entered into the range of such a device. Many conventional devices would automatically assume that audio should be transferred to the wireless device, even though the user may in fact not be in a position to even hear the device.

Further complications arise in managing certain accessory devices that include several logical inputs or outputs—such as Bluetooth headsets that implement multiple audio protocols—or in managing groups of inputs and outputs that have complementary uses—such as a headset and a microphone. Users and software developers alike find management of such groups of inputs and outputs confusing and tedious.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3A and 3B are example data tables according to an embodiment;

FIG. 7 shows an example of cycling through data tables according to an embodiment;

FIG. 8 depicts an example table for storing policy and status data, according to an embodiment;

FIG. 11 depicts an example table for storing policy and grouping data, according to an embodiment;

DETAILED DESCRIPTION

Figure 1:
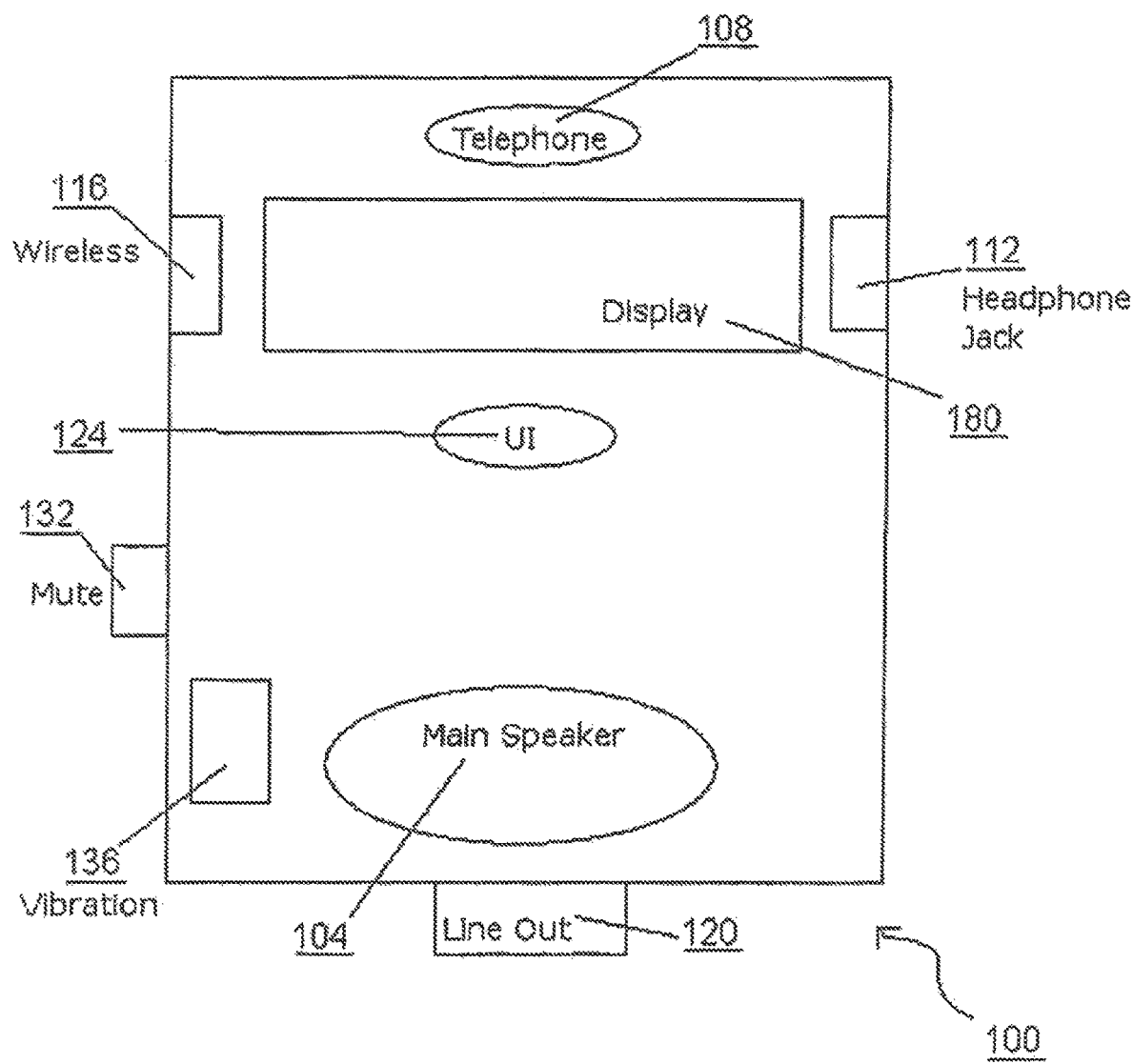
FIG. 1 is a block diagram of a handheld device upon which embodiments of the present invention can be located.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
  2.1. Example Media Device
  2.2. Example System for Managing Audio
3.0. Functional Overview
  3.1. Categories
  3.2. Policies
  3.3. Media Server Module
  3.4. Policy Module
  3.5. Routes
  3.6. Routing Manager
  3.7. Ports, Connections, Nodes, and Routes
  3.8. Routing Status Data
  3.9. Grouping Components
4.0. Implementation Examples
  4.1. Example Audio Routing Infrastructure
  4.2. Properties
  4.3. Aliasing
  4.4. Fall Back
5.0. Implementation Mechanism—Hardware Overview
6.0. Extensions and Alternatives 1.0. General Overview Approaches, techniques, and mechanisms are disclosed for routing audiovisual information through an electronic device, including a handheld computing device such as a mobile phone.

According to an embodiment, audio and/or video is routed within a device to or from various input or output components based on policy data indicating one or more routing policies. Policies are rules for making a variety of determinations useful for identifying a route for audiovisual information. Policies are conditioned upon some type of information maintained by the device, including status data, device or component properties, user preferences, and other policy data. The policies may take into account, for example, categories associated with requests to input or output audiovisual information, properties of various input or output resources, user preferences, and system or application status information (including information indicating which external audiovisual components, such as headphones, microphones, bluetooth devices, have been connected to the ports of the device). Routing of audiovisual information for the entire device may be controlled from one or more centralized modules, hereinafter referred to collectively as a resource manager. Accordingly, software applications themselves are not required to implement logic for controlling input and output resources. Moreover, the policies along with the requisite data upon which the policies are conditioned may be maintained in a database within the device at a location accessible to resource manager. Thus, the actual code of the resource manager does not have to be modified to change routing rules.

According to an embodiment, instead of just considering whether an input or output component is connected to the device, a resource manager may also base policy decisions upon routing status data indicating whether or not a connected component is "routable"—i.e. whether or not the device is permitted to route audio or video to or from a connected component. Some components, such as internal components that are always connected (e.g. a built-in speaker) may be considered inherently routable. Inherently routable components are components whose connection status never changes, and consequently are assumed to be routable unless otherwise specified. Some components, such as external components that require a user to physically perform some action to initiate connection (e.g. wired headphones), may be considered automatically routable. Automatically routable components are components whose connection status implies the user's preference towards routability, because the user would not have connected the component if the user did not intend the component to be routable. Automatically-routable components may be set to routable automatically in response to connection. Other components, such as external components that may potentially connect without user activity (e.g. wireless headphones), may be considered optionally-routable. "Optionally-routable components" are components whose connection status changes, but without necessarily implying the user's preference for routability. Unlike automatically routable components, the connection of an optionally-routable component is not assumed to, in and of itself, indicate that the component is routable; rather the component typically only becomes routable after the device receives an input (e.g. a user "gesture") indicating that the device may route audiovisual information to or from the component. In some embodiments, a component may be designated as inherently, automatically, or optionally routable based upon policies. The policies may be conditioned upon data such as user or vendor preferences.

According to an embodiment, policies may be designed to treat connected-and-routable components differently than connected-but-not-routable components when determining how to route audiovisual information. For example, a policy may cause a device to actually route audio only to connected-and-routable devices, even though the device may display connected-but-not-routable components to the user as alternative targets for the audio. If the user chooses to route audiovisual information to or from a connect-but-not-routable component, the routing status for the component may be set to routable. The component may remain routable for a predefined duration, or for a duration that is dictated by certain policies. For example, the component may remain "routable" only for the duration of the current routing operation, for a duration lasting until the component is disconnected (e.g. the device or the component is turned off, or the component is out of wireless range), or for a duration lasting until the user specifies that the component is no longer routable.

According to an embodiment, a resource manager may maintain "grouping" data indicating logical relationships between components. For example, a "sibling" relationship may be established between components that have complementary uses, such as the microphone and earphone of a single headset. Similarly, a "partner" relationship may be established between components of a same accessory device having mutually exclusive uses, such as a headset profile of a bluetooth device and an A2DP profile of that bluetooth device. These and other relationships may be considered in policies when making routing decisions. For example, the earphone of a headset may be made routable in response to the microphone of the same headset being made routable. Other interactions with the components may also occur on a relationship basis (as opposed to a component-by-component basis).

As shall be described hereafter, the routing techniques described herein may be implemented on a computing device, such as a desktop computer, a laptop computer, a PDA, a phone, or any other device through which audio or video data is routed. Further, a computer-readable storage medium, such as memory, a magnetic disk, etc, may be encoded with instructions which, when executed, cause the techniques to be performed.

As used herein, the terms "audiovisual information," refers to any type of data stream comprising audio and/or visual information for presentation to a user or input to an application. The terms "component" or "resource" refer to any logical component to or from which a device may route audiovisual information, including internal components of the device, external components that are connected to the device by a cable or some other physical means, and external components that are connected to the device wirelessly. Components may be standalone accessory devices or one of any number of software or hardware elements of the accessory device. For example, a component may be, without limitation, a built-in speaker, a built-in microphone, an external speaker, an external microphone, a headset, headphones, a wireless device, an instantiation of a bluetooth profile, a touch-screen display, an LED, a monitor, hardware capable of vibrating a device, a camera, and so on.

As used herein, the phrase "determining how to route audiovisual information through a device" and like refer to the process of determining one or more logical or physical elements of the device to or from which the device or software running thereon may send or receive a stream of audiovisual information. The techniques described herein are applicable to routing audiovisual information for both output to a component (e.g. an audio or visual presentation of information) and input from a component (e.g. audio for a telephone call or video for a recording).

2.0. Structural Overview

The techniques described herein for handling the input and/or output of audiovisual information within a device may be applied to any type of electronic device that inputs or outputs audiovisual information. Handheld electronic devices, such as personal digital assistants and mobile phones, are merely examples of devices to which the techniques may be applied. However, for the purpose of explanation, examples of the techniques shall be given with reference to handheld devices.

For convenience, the techniques of this application are often described with specific reference to the routing of audio within a device. However, the techniques of this application are just as applicable to the routing of other types of audiovisual information through a device, including, for example, video streams. Thus, for example, techniques described as being performed with respect to "audio" may also be applied to "video." Moreover, for convenience, the techniques of this application are sometimes described in the specific context of audio output. However, the techniques are likewise applicable to audiovisual input of any kind.

2.1. Example Media Device

FIG. 1 shows an example handheld device 100 upon which an embodiment of the present invention may be implemented. It is to be noted that FIG. 1 is but an example, so that devices other than that shown in FIG. 1 are also contemplated within the spirit and scope of the present invention. As shown in FIG. 1, the device 100 comprises at least a display 180 (which may or may not be touch-sensitive), a main speaker 104, a telephone receiver/speaker 108, a jack 112 for either headphones (listen only) or headset (listen and talk), a wireless transmitter/receiver 116 such as but not limited to Bluetooth®, a line out port 120 (suitable for a docking station used by e.g. larger home-audio system), and also a user interface (UI) speaker 124 (e.g. for keypad click-tones). Device 100 may include other types of speakers and audio ports. Device 100 also need not necessarily include all of the features depicted in FIG. 1. As stated, the device 100 is but one possible embodiment, so that the techniques described herein are not limited exclusively thereto.

The built-in telephone receiver/speaker 108 may be, for example, similar to a receiver used within a conventional telephone or capable of outputting high-fidelity sound. The touch-sensitive version of the display 180 may, for example, contain a keypad which in turn can generate sounds when touched.

The device 100 further comprises a mute switch 132, and a vibration mechanism 136. A mechanism for enabling/disabling the vibration means 136 is available through the display 180 by accessing a software application loaded on the device 100.

Software applications that may be executed by one or more processors on the device 100 include but are not limited to e-mail, telephone, voice-mail, web-browser, short messaging service (SMS), entertainment player either for music or video, camera, and slideshow (with music accompaniment).

The UI speaker 124 is intended mainly for playing keypad sounds (clicks) and notifying the user that certain steps and key-actions may be illogical or not permissible (beeps). However, under certain circumstances this policy can be overridden.

2.2. Example System for Managing Audio

Figure 2:
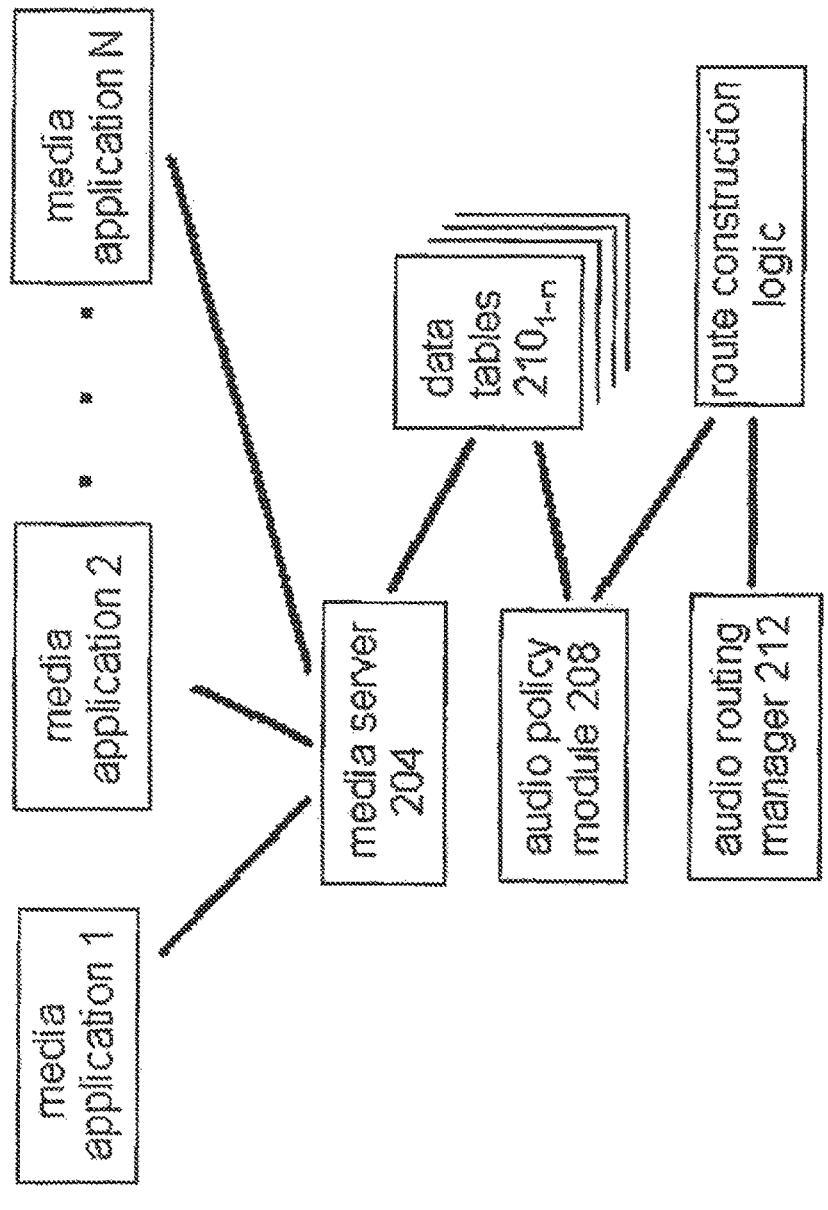
FIG. 2 is a functional overview of an embodiment of the present invention.

FIG. 2 shows an example system 200 for managing audio routing within an electronic device, according to one embodiment of the present invention. FIG. 2 is but one example of a possible system, and other types of arrangements could also be achieved within the spirit and scope of the present invention. Within the system 200, a media server 204 acts as an interface and coordinator with the various software applications that may need to use audio resources within the device 100.

The media server 204 achieves this partly by communicating with an audio policy manager 208 in order to determine what resources are available, and what policies exist for playing audio. The audio policy manager stores various policies and other resources in tables $210_{1-n}$. The audio routing manager 212 is responsible for determining a suitable route for the requested audio.

The system 200 also tracks what has happened in recent user history. Not just the most recent user choice ("last in"), but also second to last in, third to last in, and potentially further back.

System 200, and any other systems capable of managing the flow of audiovisual information through an electronic device, is hereinafter referred to collectively as "a resource manager." Moreover, actions referred to as being performed by system 200 (or any other resource manager) may be performed by any component of system 200. Likewise, applications performed by one component of system 200 may instead be performed by other components of system 200. System 200 may further include additional components, as needed, for the purposes of routing and determining how to route requests to use input or output resources.

In some embodiments, the components of system 200 may be more broadly used for purposes other than audio input or output. For example, audio routing manager 212 may be a more general routing manager for routing picture or video inputs and outputs. Audio policy manager 208 may be a more general policy manager storing policies for playback or input of all types of audiovisual information.

3.0. Functional Overview
3.1. Categories

Within various conventional devices, each software application must implement its own decision tree for routing audio by itself. Since the logic for selecting audio resources is implemented differently from software application to software application, the user is often unable to anticipate how a given software application will utilize audio resources. Moreover, software developers must devote time and resources to developing their own decision trees for managing sound. By contrast, according to an embodiment, decisions for routing audiovisual information within a device may be centralized within a system such as system 200 by utilizing information about sound categories that is forwarded from software applications to, for example, the media server 204.

To this end, software applications request the use of input or output resources within the device 100 by specifying categories of audio to the media server 204. These categories are established for audiovisual information based on the intent of the audiovisual information (which is different from the format and/or source of the audiovisual information). Examples of potential audio categories within the system 200 include but are not limited to music, video soundtrack, voice telephone call, telephone voice mail, e-mail notification, short message service (SMS) notification, user interface sounds, ring tones, and alerts. UI sounds comprise separate sub-categories of audio, including but not limited to clicks and beeps.

3.2. Policies

General factors used to determine how to route audio can include, for example, the audio category, the status of a switch such as physical switch 132, the currently connected input or output components (e.g. headphones, wireless), routeability data indicating input or output components that the device is permitted to utilize, grouping data indicating logical relationships between input or output components, user preferences, and the current state of the device 100 (e.g. power status, telephone call status, media player status, the time of day, and status data provided by other applications or resources such as a calendar or GPS device). Additional factors may include, for example, the identity of the software application that wishes to route the audio. This and other information assists in forming the audio policies that are used by the system 200.

According to an embodiment, a user interface for audio policies within the device 100 may be designed simplistically so as to avoid introducing too many choices to the user and also render the meaning of the policies clear to the user, so that the user is never surprised or left with the question "why did that happen?" Accordingly, a set of default policies exist per audiovisual information category. For example, one such default may be that user-initiated sounds (such as the UI keyclick sound) are muted when the mute switch 132 is enabled. Thus, even though these sounds are expected by the user and not very obtrusive, if the mute switch 132 is enabled, the key clicks are not heard. Such default policies may, however, be changed.

According to an embodiment, policies may also prohibit certain types of audio routing. Again, these policies can be over-ridden. For example, one policy may be that music is unlikely to be played to the UI speaker 124. Yet another (waiveable) policy may be to not play music through the wireless speaker 116, although in certain cases music could be mixed in. These policies are not fixed and immutable, but instead part of the flexibility of matching a user interface with the hardware capabilities of a device.

As another example of a policy, if a telephone call is in progress, a policy may assume that only one audio route should exist, and thus route all audio through the same speaker. This is because the user may be focused on the telephone call, and potentially unable to hear any of the other audio speakers regardless of whether those speakers are available or not. Accordingly, if an e-mail notification comes in, the policy may indicate that device 100 should mix the e-mail notification into the telephone audio.

As yet another example of a policy, if a notification is deemed to be sufficiently important (by policy), that notification may be broadcast across all speakers.

3.3. Media Server Module

The media server 204 is a centralized mechanism for handling audio associated with the various media-playing software applications. Accordingly, the various software applications do not need to have their own logic and resources for deciding how to manage audio. Instead, these software applications merely forward a request indicating their intent to route a certain type of audio to the media server 204. As part of the request, the software applications disclose a specific audio category to the media server 204. The software applications then depend on the media server 204 to consider policies and factors such as those described herein, so as to ensure the appropriate audio gets properly routed. Where possible, the media server 204 will honor the intent forwarded by an application, but in some cases may be forced to refuse a request or employ a different strategy than requested by the application.

The types of decisions expected of the media server 204 include but are not limited to determining: whether to route the audiovisual information at all, through which port to input or output the audiovisual information, a volume level at which to input or output audio, a specific data stream to play, whether to vibrate, whether to click, whether to blink the display 180, as well as other tasks. The media server 204 evaluates the requests forwarded by the various software applications partly by classifying their various audio requirements into audio categories.

The media server 204 centralizes and ensures consistent audio decisions that do not surprise the user. The media server 204 discerns the intent of the audio category, and then communicates the requested category to the audio routing policy module 208, which references the various data driven tables $210_{1-n}$. Whenever the user adds or removes a piece of hardware, the data tables $210_{1-n}$ are updated. Accordingly, the audio routing policy module 208 always knows what is connected to the device 100. The audio routing manager 212 then tells the device 100 how to route the audio.

3.4. Policy Module

The audio policy module 208 enforces policies for each of the numerous audio categories. The audio policy module 208 can use metadata-based representations of these policies within the tables $210_{1-n}$, as opposed to the policies being coded into executable logic. However, the policies utilized by audio policy module 208 may be code driven instead.

As shown in FIG. 2, alongside both the media server 204 and the audio routing policy module 208, several data tables $210_{1-n}$ are used, thereby forming a multi-dimensional decision matrix. As the user changes their preferences and takes other actions that have input or output resource implications, the system 200 updates various of these data tables $210_{1-n}$, while others may remain unchanged. System 200 is sufficiently intelligent to distinguish between the user connected a headphone components as opposed to headset components to port 112, and to update various of the tables $210_{1-n}$ accordingly.

Last-In Wins Policy

One example policy that may be implemented by the audio policy manager 208 is a "last in wins policy." According to the "last in wins policy", in situations where multiple connected devices are capable of serving the same role in a routing operation, the most recently connected device is selected to play that role. For example, assume that a user plugs in headphones 112 after a wireless connection 116 to a headset has been established. Under these conditions, both the wired headphones and the wireless headset may be capable of playing audio from an incoming call. Based on the last in wins policy, the headphones 112 are selected for playing the audio of calls based on the assumption that the user plugged in the headphones 112 because the user wants to hear audio through the headphones 112, and not the wireless 116. Thus, system 200 may employ the "last in wins" policy. In essence, the "last in wins" policy codifies the assumption that the last action the user took to affect a device's input or output resources indicates how the user wants to experience audiovisual information.

Policy Overrides

However, like any policy, it may be desirable to override the "last in wins" policy in certain circumstances. To this end, the policies stored or expressed in the tables $210_{1-n}$ are not rigidly enforced, but instead serve as a guide to the media server 204 and the audio policy module 208. There can therefore be user-initiated overrides of the policies. In carrying out its responsibilities, the audio policy module 208 may consider various other policies in data tables $210_{1-n}$. For example, another policy may indicate that audiovisual information designated as being in an anti-"wireless" category may not be routed through a wireless device. For instance, audio in this category may be not suitable for playing over wireless (e.g. UI sounds). If the "last-in" audio component supports wireless, but the category is "anti-wireless—then the audio policy module 208 will instead select that "last-in" "non-wireless" audio output device (e.g. UI speaker 124). This is a simple example where the "last-in wins" policy is conditional and not always obeyed.

Another example of an override is a user-initiated override. For example, a software button on the display 180 may allow a user to divert a telephone call to the main speaker 104. This clear and unmistakable user choice may override other policies, including even the "last in wins" policy.

As another example, suppose the mute switch 132 is enabled. One policy that may be implemented while mute switch 132 is enabled is that user-initiated sounds (e.g. typing feedback) may still sound—that is, be non-muted—but that non-user-initiated sounds (e.g. e-mail notifications or SMS notifications) do not sound. Setting aside the mute switch 132, another policy may be that user-initiated clicks such as typing sounds and other beeps are generally not routed to the main speaker 104.

Yet another example policy is that the wireless 116 and telephone receiver 108 outputs are unlikely preferences when the audio category is music, and thus should appear as extremely low in priority within the tables $210_{1-n}$, if at all.

According to one embodiment, within the system 200 there are certain policies that are unaffected by the user actions. Other policies in other tables, however, change depending on user-derived actions. For example, when a user adds or removes an input or output component, various status or priority data in data tables $210_{1-n}$ may change and thus affect policies expressed in those tables.

Consideration of Multiple Policies

Audio policy module 208 may need to consider a variety of different types of policies to determine how to route audiovisual information. For example, one of the data tables $210_{1-n}$ may hold the policy data: "user prefers to be apprised of incoming e-mail notification." Thus audio policy module 208 may determine from this policy data that the user prefers that the e-mail notification be permitted to sound. However, specific mechanisms for performing notification may be indicated by a different data table. The audio policy module 208 would therefore need to consult other policies in the various data tables $210_{1-n}$ and decide 1) whether to generate the notification as audio sound, vibration feedback, both audio sound and vibration feedback, or neither; 2) through which audio output to route any audio for the notification.

Status, Priority, and Resource Data

According to an embodiment, the data tables $210_{1-n}$ also contain information about the properties of routes, connections that belong to routes, and nodes that belong to connections. The properties describe how the nodes, connections, and routes should be configured. The values of such properties may affect a variety of decisions, including whether routes are selected, whether specific connections within routes are optional, and how audio is processed at specific ports when specific connections are used to route the audio.

According to an embodiment, audio policy module 208 stores data indicating the order in which pluggable input or output components have come online within various of the tables $210_{1-n}$. Such data may be, for instance, a prioritized list. According to an embodiment, audio policy module 208 also stores within the data tables $210_{1-n}$ a map of per-audio-category information including whether that audio category is broadcast to multiple outputs, whether that category obeys or ignores the ringer/mute switch 132, and a prioritized list of routes, such as those shown in FIG. 6. According to an embodiment, audio policy module 208 further stores a list of outputs (both pluggable and non-pluggable) which should be ignored if the ringer/mute switch 132 is enabled.

Events

According to an embodiment, events within device 100 may cause system 200 to change audio categories. Examples of such an event include a song ending or a user clicking a key on the display 180. At the time of such an event, the media server 204 may instruct the audio policy module 208 to change categories. Audio policy module 208 may then analyze policies to select a new port through which to route audio—e.g. audio policy module 208 may review the top of the ordered list of pluggable input or output components described earlier.

Figure 5:
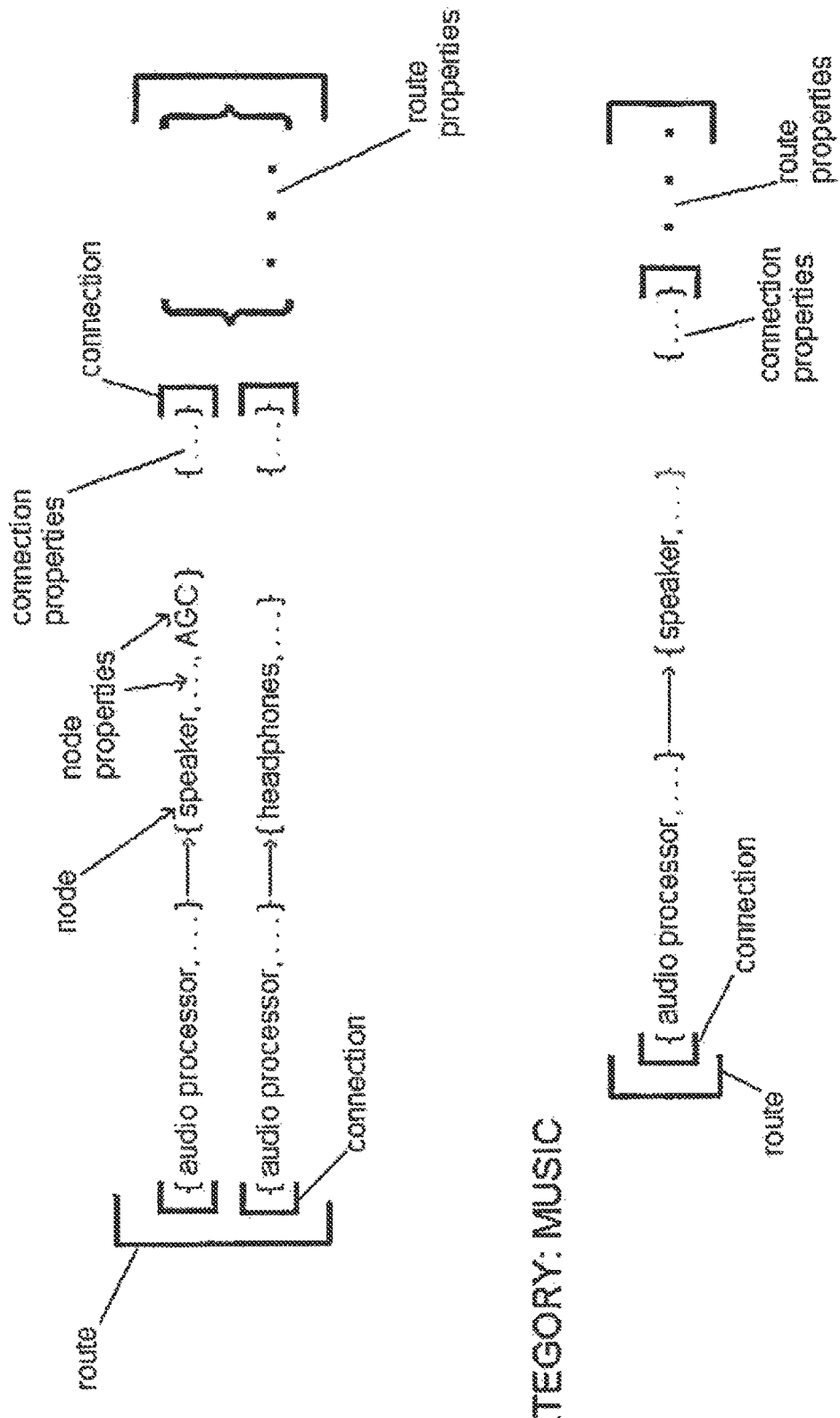
FIG. 5 shows examples of nodes, connections, routes, and properties, according to an embodiment.
Figure 6:
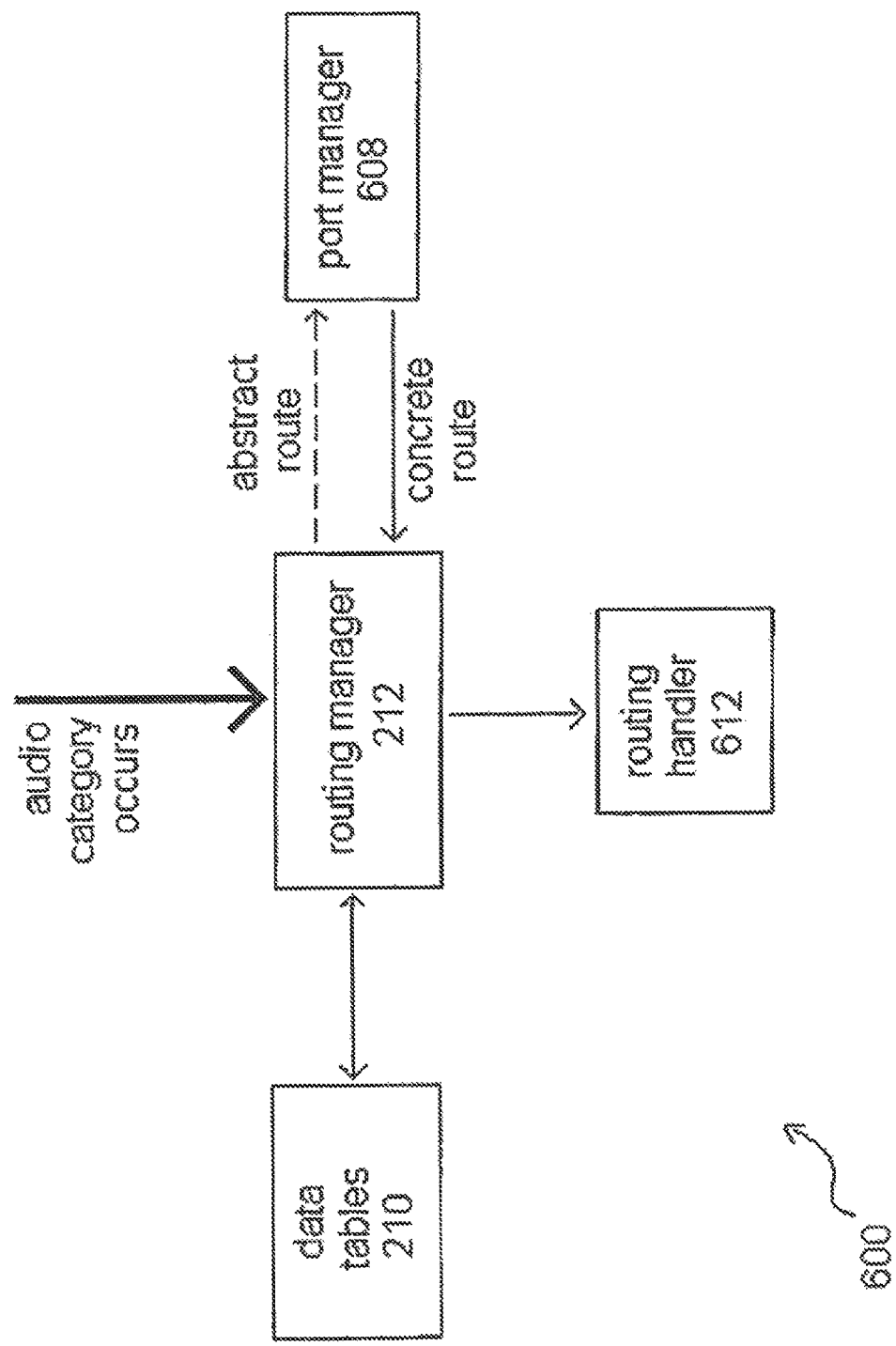
FIG. 6 is a block diagram of an example audio hardware arrangement according to an embodiment.

At the time of such an event, the audio policy module 208 may also review the audio category in the stored map within the data tables $210_{1-n}$ and determine whether a "last in" pluggable output is stored in the prioritized list of routes within the data tables $210_{1-n}$, such as those shown in FIG. 7. If the "last in" pluggable output is stored therein, the audio policy module 208 may select an appropriate route description, and requests that the audio routing manager 212 commit to the route for playback. If the "last in" pluggable output is not stored therein, the audio policy module 208 may instead read the remaining items in the map of per audio-category information, and compares those items with the prioritized list of routes. If another output is present, the audio policy module 208 may then select an appropriate route description for the other output, and requests that the audio routing manager 212 commit to the route. Details about the prioritized list of routes and how audio routing manager 212 carries out these requests are shown in FIGS. 5-7 and their accompanying descriptions.

According to an embodiment, some events may cause a route change for other reasons. For example, whenever a new pluggable component becomes available, the audio policy module 208 may push the pluggable component to the top of the ordered list of outputs stored within the data tables $210_{1-n}$, and then looks up the currently applied category in the audio category map. The audio policy module 208 then determines whether the new pluggable component exists in the prioritized list of route descriptions. If the new pluggable component exists within the existing route descriptions, the module 208 outputs policy findings to the audio routing manager 212, and requests that the audio routing manager 212 commit the appropriate route.

Example Scenario

As an example scenario, suppose a user wants to listen to music. The audio policy module 208 may consult connected status data to determine which outputs are connected, routing status data to determine through which of the connected outputs the device is permitted to route audio, as well as device priorities associated with music playback. The audio policy module 208 may note that, for example, both headphones as well as the main speaker are connected and available for playback. The audio policy module 208 may then consult a data table holding priority information associated with the music category. The first priority may be the line out port 120, but that feature is not currently connected. The audio policy module 208 may then proceed down the priority list. The next item may be the headphones 112, while main speaker 104 may be the third item in the priority list. The audio routing policy module 208 will accordingly choose headphones 112 for audio output, and mute the main speaker 104. However, other embodiments of the invention may arrive at different routing decisions in this scenario, such as to enable the main speaker 104 simultaneously with the headphones 112.

Example Policy and Status Data

FIG. 3A depicts an example data table $210_1$ holding some abbreviated policy information, according to an embodiment. According to other embodiments of the invention, data table $210_1$ could differ significantly from that shown in FIG. 3A, including more or less detailed information about the status of device connections and the policies to be employed by system 200. For purposes of brevity, only five of the audio outlets within the device 100 are shown although numerous others may exist. Similarly, only three types of audio categories are shown, although again numerous others may exist.

In maintaining the table $210_1$, the status of various input or output components is continually queried and updated by the system 200. Consequently, the first column is "present?", meaning is the specific audio outlet present, enabled, and available for use. In the example shown, the main speaker 104, headphones 112, and UI speaker 124 are present, and the asterisk at the headphones 112 means that the headphones 112 were "last in". Meanwhile, the wireless 116 and line out 120 outputs are not present, and thus not available for use. However, the wireless 116 is shown with two asterisks, symbolizing it was "second to last in". As stated, the various tables $210_{1-n}$ work together to store data about user history.

The next three columns show three types of audio categories. The data in these three columns indicates policies as to whether or not those audio in those categories can be routed to or from the five listed input or output components. For clarity, priority information and property information which may be included in other policy data tables is intentionally not shown in the data table $210_1$. An example priority sequence is instead shown in the data table $210_2$ of FIG. 3B, as shall be discussed below.

One way for audio policy manager 208 to interpret the policy data in data table $210_1$ is as follows. Starting with the category "keypad audio," the table expresses a general policy that audio in the category be played over UI speaker 124, and not through main speaker 104 or headphones 112. Because the wireless 116 and line out 120 are not connected, no policy is indicated for those components. As for the "ring tones" category, audio in this category may be played through the main speaker 104, and potentially through the headphones 112, but only under certain policy conditions. To determine what those policy conditions are, it may be necessary to view data from one of the other tables $210_{2-n}$. Ring tones should not be played through the UI speaker 124 as general policy. The last category of FIG. 3A is "music," which may be played on the main speaker 104 or the headphones 112, but as general policy is not playable on the UI speaker 124.

Example Priority Data

Figure 3B:
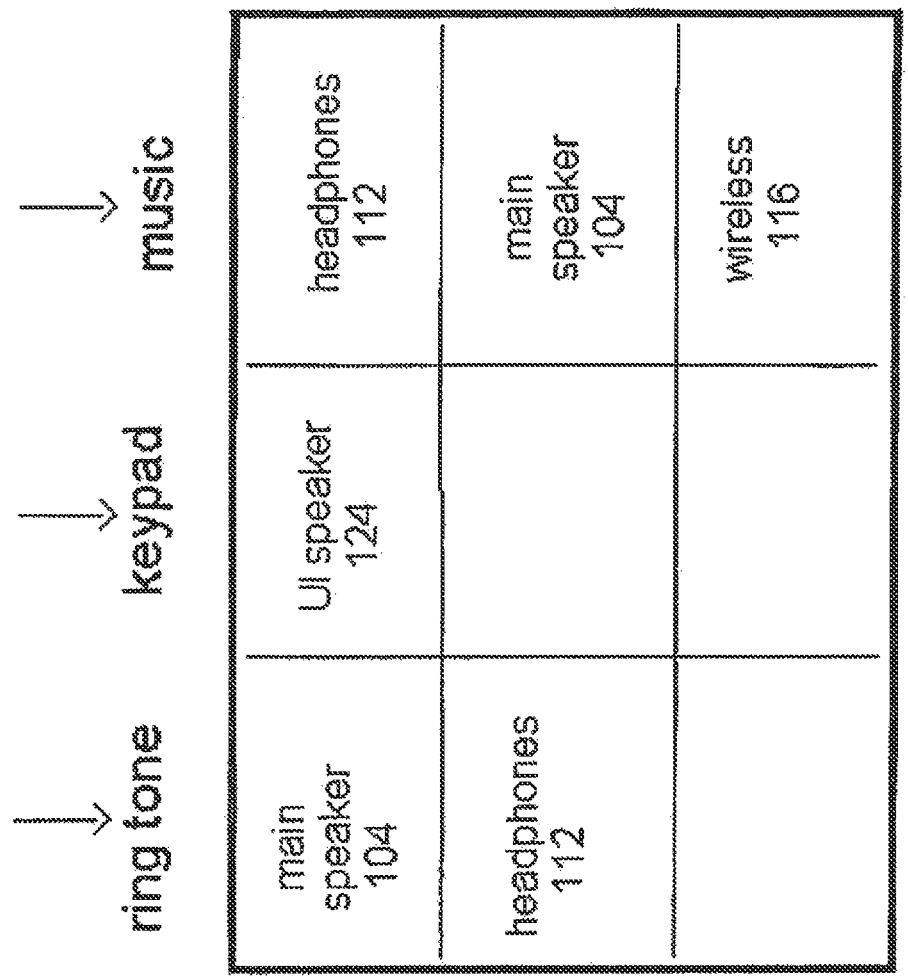

FIG. 3B shows an example priority data table $210_2$, according to an embodiment. The example priority data is a subset of the policy data that may be maintained in the data tables, in that the priority data expresses policies for determining which component has the highest priority for routing. For consistency, FIG. 3B has the same example audio categories as FIG. 3A, with various input and output components ranked in order of priority for those categories.

Again, like with FIG. 3A, FIG. 3B is abbreviated, truncated, and simplified for purposes of brevity. Other embodiments may include less or more elaborate priority data.

One way for audio policy manager 208 to interpret the policy data in data table $210_2$ is as follows. If a ring tone occurs, the first priority would be to play it over the main speaker 104. However, if the main speaker 104 is not available, then the system 200 should play the ring tone over the headphones 112. Similarly, if a keypad noise occurs, the audio associated therewith should be played over the UI speaker 124. If music occurs, the first choice should be the headphones 112, but if that is not available the second choice the main speaker 104, and if those are not available the third would be the wireless 116. The presence of the wireless 116 might be stored in the data table $210_2$ despite the fact that the data table $210_1$ shows that the wireless 116 is disconnected. One reason for this presence could be recent usage history, specifically that the user recently used the wireless 116 and thus may use it again.

According to an embodiment, in both example data tables $210_1$ and $210_2$, the policies and priorities are not absolute, but instead are suggested. Under certain circumstances both policies and priorities may be overridden.

3.5. Routes

System 200 constructs routes by doing a series of appends of small steps to form a complete path. In one embodiment, routes are formed by using a type of grammar. This grammar may have varying degrees of complexity. A simpler embodiment may rely on grammar describing only a source and destination (i.e. a direct path).

In some embodiments, there may be problems or conflicts that complicate the route of an audio stream to its intended destinations. Thus, the audio policy module 208 may rely on a grammar that allows it to intelligently make routing decisions through, for example, a variety of audio signal processors. A route in such an embodiment may go beyond source and destination and also contemplate intermediate points (i.e. an indirect path), thus eliminating some or all of the uncertainties over routing. Without the intermediate steps, an audio routing manager must infer a route only from endpoints (source and destination). It may therefore be preferable in some embodiments to avoid such inferences.

In other embodiments, the routes are constructed for both direct path and indirect path situations.

Figure 4:
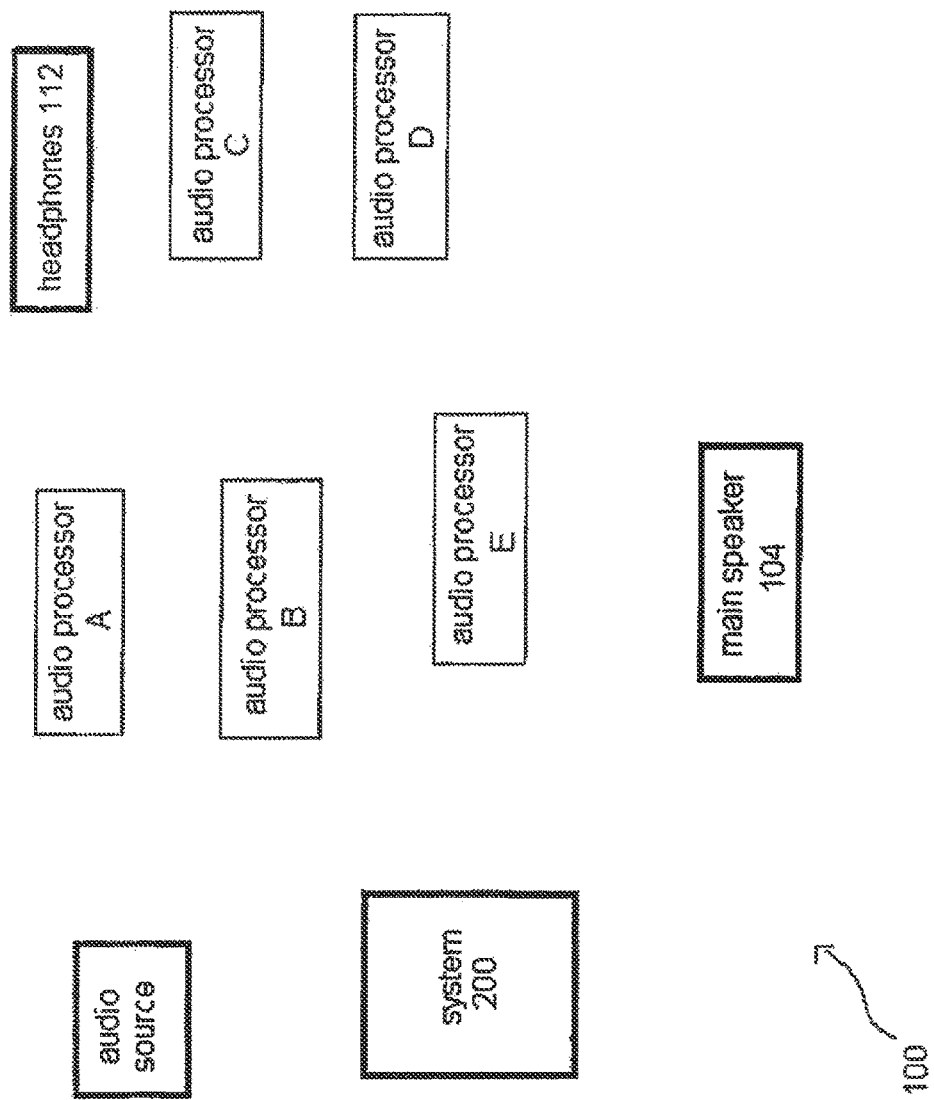
FIG. 4 is a block diagram of an example audio hardware arrangement according to an embodiment.

FIG. 4 depicts an example of how the system 200 achieves routing, according to an embodiment. FIG. 4 shows a group of audio processors A, B, C, D, and E. Any or all of these audio processors may have codec capabilities, and may also have baseband features. FIG. 4 is a block diagram version of only a portion of the audio capabilities of the device 100, and is simplified for the purposes of brevity.

In FIG. 4 an audio source, such as a software application executing on device 100, is shown. For purposes of example, within FIG. 4 it will be assumed that system 200 is responsible for deciding how to route audio from the audio source to either the main speaker 104, the headphones 112, or both.

An example of a route that would be direct path is:
audio source→main speaker 104.
An example of a route that would be indirect path is:
audio source→audio processor A→audio processor D→main speaker 104.

3.6. Routing Manager

As described in previous sections, audio policy module 208 makes policy findings by comparing audio category data to data about currently attached devices, as well as other criteria including policies and properties of the ports, nodes, connections, and routes. Then, the audio routing manager 212 identifies routes from routing data as discussed above. Finally, the audio routing manager 212 commits an identified route based on the policy findings as well as on the properties stored in the data tables $210_{1-n}$. The audio routing manager 212 can achieve this result using a variety of means.

According to an embodiment, the audio routing manager 212 may also serve a number of other functions.

Manipulation of an Audio Stream

According to an embodiment, the audio routing manager 212 is responsible for implementing policies for manipulating the audio stream, such as mixing audio, removing unwanted pops and other noises, and volume-matching. One way audio routing manager 212 may achieve such results is to ramp up when potential problems or aberrational sounds are suspected, thereby preventing unwanted pop sounds due to spikes.

As another example, system 200 may support volume selection that only affects certain audio, and not other audio. For example, it is possible that a user wishes to only change the volume of an audio stream being routed to the headphones 112, but not change the volume of any audio that may be routed to the main speaker 104. To support such a policy, system 200 reviews the various tables $210_{1-n}$, and determines which of the audio categories is in use at a given time. At that point, the audio routing manager 212 ensures that the specific category in use is the only one which the volume selector is linked to. For instance, a user may have set the main speaker 104 to a lower volume, for softer music, while at the same time have specified a policy to make a ring-tone much louder than the music. The audio routing manager 212 may be responsible for implementing such volume adjustments.

A user may also specify a preference that indicates volume levels that are inappropriate. A capping policy may be implemented, wherein a maximum volume is imposed under certain circumstances, regardless of a user's selection. The audio routing manager 212 may likewise be responsible for implementing this volume limitation.

Another policy implemented by audio routing manager 212 may be to temporarily "duck" a first audio stream, such as music, in order to temporarily increase emphasis on a second audio stream, such as a ring tone. When the second audio event has finished, the first audio stream may be restored to its original volume. The system 200 may be responsible for implementing this "ducking," as well as for consulting policy data to determine which audio categories and under what circumstances to "duck" audio.

According to an embodiment, various and perhaps all of the audio processors A-E may affect the volume of that audio as heard by the user. Although only five audio processors are shown in FIG. 4, within any particular device 100 there may be a large number of audio processors. Consequently, knowing every step from source to destination makes it easier for audio routing manager 212 to manage all volume levels along the route, thereby assuring an appropriate playback experience, with no sudden spikes in volume. All of the elements within FIG. 4 are examples of nodes, but only the audio source, headphones 112, and main speaker 104 are examples of ports.

Route-Based Policy Feedback

The audio routing manager 212 may furthermore interpret the policy findings of the audio policy module 208, to ensure that certain policy findings make sense. For example, the audio routing manager 212 may report back to the audio policy module 208 that certain policy findings cannot be implemented. When policy findings can be implemented, the audio routing manager 212 may then decide how to route the audio through the appropriate audio signal processing hardware, as shown in FIG. 4. For example, audio for the headphones 112 may be processed by different audio processors than audio routed to the main speaker 104.

Broadcasting Audiovisual Information

Another feature of the audio routing manager 212 is to "broadcast" certain audio (e.g. play the same ring-tone out of main speaker 104, headphones 112, and line out 120). A policy may exist in which it is desired to play through all speakers, due to desire to not miss a telephone call. This may be suitable in an instance where, for example, the headphones 112 are plugged into the device 100, but not on the user's ears. Thus, the audio routing module also has provisions for a "broadcast route"—that is, play through multiple speakers at once.

Audio Mixing

According to an embodiment, the media server 204 by itself does not allow changing of routing for existing audio, but may request that the audio routing manager 212 mix in other audio with the current category, such as UI audio or some type of notification, with the audio that is currently playing. Such behavior may be convenient because the media server 204 can make this request without checking with the audio routing manager to ensure that a route exists.

Example Operation of the Audio Routing Manager

According to an embodiment, the audio routing manager may be used in the following example scenario. Suppose that a user connects a wireless headset to the device 100. The media server 204, the audio policy manager 208, and the audio routing manager 212 would "find" the wireless device, and connect it to both uplink (source) and downlink (playback) paths. In this example it will be assumed that the user wishes to hear music through the wireless headset, although that may not always be the case.

Now suppose the user receives a telephone call. The audio policy module 208 would first decide how to route the ring tone, and then how to route the telephone audio. After obtaining the policy findings from the audio policy module 208, the audio routing manager 212 would in turn determine how to route first the ring tone and then the telephone audio.

This process may be achieved as follows. The audio policy module 208 may first check one of the data tables $210_{1-n}$, and learn that the wireless headset 116 is connected, but that the telephone receiver speaker 108 also is connected. The audio policy module 208 may then check a priority table, and determines that the wireless headset 116 is a higher priority than the telephone receiver speaker 108. The audio policy module 208 would then forward these logical findings to the audio routing manager 212, which would then select a route for the audio and facilitate that route.

When the route is complete, the audio routing manager 212 may indicate to the media server 204 a "ready" signal, signifying that a route is available and ready for use. The media server 204 could then accept a software application's request to play audio. However, in some embodiments, the software application would be configured to understand that such acceptance is always temporary, and subject to various changes.

3.7. Ports, Connections, Nodes, and Routes

As explained above, according to an embodiment, when audio needs to be routed within device 100, a category for the audio may be determined. The manner of routing the audio within device 100 may be selected based, at least in part, on the category thus determined.

For each category, routing information may be stored within a database that includes data tables $210_{1-n}$. In one embodiment, the routing information for a category is organized into one or more routes, and each route is organized into one or more connections. The following definitions apply herein:

a port is a logical or physical interface through which audio or video may be routed and to which various input or output components may be connected (e.g. a mic-in port, line-out port, serial port, or Bluetooth port);

a connection is a path from an audio beginning point to an audio end point (e.g. a path from an audio-in port to a speaker), and is a means by which two or more nodes are connected;

a node is any component involved in a connection, including ports, input or output components, audio processors, software applications, and so on; and a route is a group of one or more connections.

FIG. 5 shows an example grammar for routes, connections, and nodes, according to one embodiment. The arrangement of FIG. 5 is for example purposes only. Within FIG. 5, two audio categories are shown: ringtone and music. To simplify the example, each of the categories includes a single route. However, each category may include many routes. In one embodiment, the routes for a category are prioritized within the data tables $210_{1-n}$. These prioritized lists that belong to a category are collectively referred to as the priority-ranked route list of the category. From FIG. 5, it is apparent that a single route can contain multiple connections, and that a single connection contains two or more nodes.

Other embodiments may accept requests to route audiovisual information with metadata that indicates characteristics of the audiovisual information besides or in addition to the categories. For example, the metadata may indicate a sampling frequency or encoding mechanism. In an embodiment, a request may be made with no metadata at all. For example, policy, routing, and connection data may include data for a default category instead of or in addition to other categories, and the default category may be used for all requests unless the request includes category information.

3.8. Routing Status Data

According to an embodiment, a resource manager such as system 200 may maintain status data for each of a number of input or output components. For example, the "present?" column of table $210_1$ in FIG. 3A may be considered connection status data, in that it indicates that a component is connected to the device.

FIG. 8 depicts an example table 810 for storing policy and status data, according to an embodiment. Table 810 is another example of a possible table $210_{1-n}$. As with table $210_1$, table 810 includes status data for five different components. Each component corresponds to a row of table 810. Status data for the five components is maintained in columns 812 and 814. The data in column 812 indicates whether or not the component is currently connected. The data in column 814 is considered routing status data and indicates whether or not the component is considered routable—i.e. whether or not the system is permitted to route audiovisual information to or from the resource. The status data may be considered a subset of policy data, in that the status data expresses policies that are specifically conditioned upon the status of the components that may be connected to the device.

In managing routes, the resource manager may access one of or both the connection status data and the routing status data. For example, table 810 indicates that wireless component 116 is connected but not routable. A policy may indicate that audiovisual information should not be routed through non-routable components. After consulting the routing status data, the resource manager may thus refuse to route audiovisual information through wireless component 116. At the same time, an interface may query the resource manager for information indicating a list of which input or output resources are connected to the device. For the purpose of answering this request, the resource manager may rely upon connection status data instead of routing status data, and thus indicate that wireless component 116 is in the list of connected resources.

Table 810 further includes policy data in columns 816 and 818. The policy data in column 816 indicates policies for how or if the device should modify the routing status data in the event of a connection event for the component. For example, main speaker 104 and UI speaker 124 are indicated as inherently routable. The resource manager therefore need not take action in response to a connection event for these components (of course, these components, having a built-in connection, may never trigger a "connection" event). Headphones 112 and line-in/line-out component 120 are indicated as automatically routable, and the resource manager may therefore automatically set their routing status data to indicate that the components are routable upon connection. Wireless component 116 is indicated as "optionally routable," and the resource manager may therefore automatically set the routing status data to indicate that the components are not routable upon connection. Or, in embodiments where routing status data is assumed to already be non-routable for newly established connections, the resource manager may implement a policy of simply not modifying the routing status data for optionally routable components. Optionally routable components may subsequently become routable in response to various inputs, as shall be subsequently discussed. In some cases, other policies may override a components' "optionally routable" status, causing the resource manager to indicate that certain or all components indicated to be optionally routable should be instead made routable upon connection.

The resource manager may consult policy data in column 818 to determine various policies for contexts in which audiovisual information may be routed to or from the various components. For example, the resource manager may have been informed that a certain stream is a "ring tone," and thus use the policy data in column 818 to determine a policy for which components are allowed to output a "ring tone." Alternatively or additionally, table 810 may contain policy data for categories of audiovisual information, as in table $210_1$.

According to an embodiment, a user configuration interface may access data in table 810 to determine a list of components that are optionally routable or automatically routable. The interface may then indicate to the user the routing status of each of the listed components. The interface may also present controls for setting the routing status for a component to "routable" or "not routable."

Once modified by the user, the routing status for a component may remain so modified for a certain duration of time. For example, a wireless component may remain routable until its connection to the device is lost. The connection may be lost, for instance, due to the component being turned off, the device being turned off, the component being moved out of range, and so on. Alternatively, the wireless component may remain routable for the duration of a specific use (e.g. a telephone call), or until the user once again modifies the routing status. This duration may be set to a default value for certain types of devices. The duration may also or instead be controlled by policies and/or user preferences.

For example, a user may prefer to playback music on a particular wireless headset. The headset may be initially treated as an optionally-routable device. Therefore, when the wireless connection is established with the headset, the headset may be treated as not routable. The user may then be presented the option of selecting the headset for playback of music. In response to selecting the headset, the headset is made routable. The user may then be presented with the option of indicating that the headset is "always routable". If the user does not make the headset always routable, then the headset is automatically made not routable again when the headset is disconnected. However, if the user makes the headset always routable, then the headset will remain routable when disconnected. Because the headset remains routable, the user would not need to expressly select the headset for music playback the next time the headset is reconnected.

As with any policy data, the device may present various interfaces for configuring the policy data in columns 816 and 818 and/or the policy data may be set to default values for certain types of components. For example, the resource manager may be coded to automatically store policy data in column 816 indicating "optionally routable" for all types of wireless components and "automatically routable" for all types of wired components. The device may also present configuration interfaces wherein a user may change these policy settings for individual components or groups of components.

As with any of tables $210_{1-n}$, although the data in table 810 is depicted as being maintained in table form, the data stored therein may in fact be stored in any suitable form, including text, XML, or binary. Moreover, some or all of the data in table 810 (and tables $210_{1-n}$) may be represented differently from embodiment to embodiment. For example, the word "yes" might just as easily be enumerated as an integer or Boolean variable. In some embodiments, some or all the data may be bits and organized in such a manner that some or all of the policy determinations may be made by performing relatively simple operations such as masking or bitwise arithmetic.

Predictive Routing Calculations

According to an embodiment, a device may utilize connection status data and routing status data internally for many purposes. For example, connection status data and routing status data may be utilized to run various predictive scenarios to determine how audio would be routed in the event that the routing status of a connected component suddenly changed. Such scenarios may be useful, for instance, in computing backup routes or in indicating to a user a specific component through which audiovisual information would be routed should another component be turned off.

For example, a handheld device may have limited real estate in which to present a resource management interface, and may therefore wish to only present management controls for a select number of audiovisual components. The device may present a first control for a wireless component, which is used to configure the routing status for the highest priority wireless component. Below the first control, the device may present a second control corresponding to the component through which audiovisual information will be routed when the wireless component is not routable, as indicated by the predictive calculations.

For example, assume that the device has several connected components capable of playing back music. Assume that some of these components are optionally routable, some are automatically routable, and some are inherently routable. When presenting the user with selection options, it may be undesirable to present the user with a list all of the components. Instead, the user may be presented with a list that includes only (a) the component that would be selected by the policies if all the components were routable, (b) the component that would be selected by the policies if all of the optionally routable components were not routable, and (c) the component that would be selected by the policies if only the inherently routable components were routable.

The foregoing example is merely one example of how the routeability characteristic of a component may be used in determining what selection options are presented to a user. Many other uses are possible. For example, the user may be presented the option of selecting any of the optionally and automatically routable components, but of the inherently routable components may only be presented with the one that would actually be selected by the policies if no optionally or automatically routable components were connected.

Example Process Flow for Utilizing Routing Status

Figure 9:
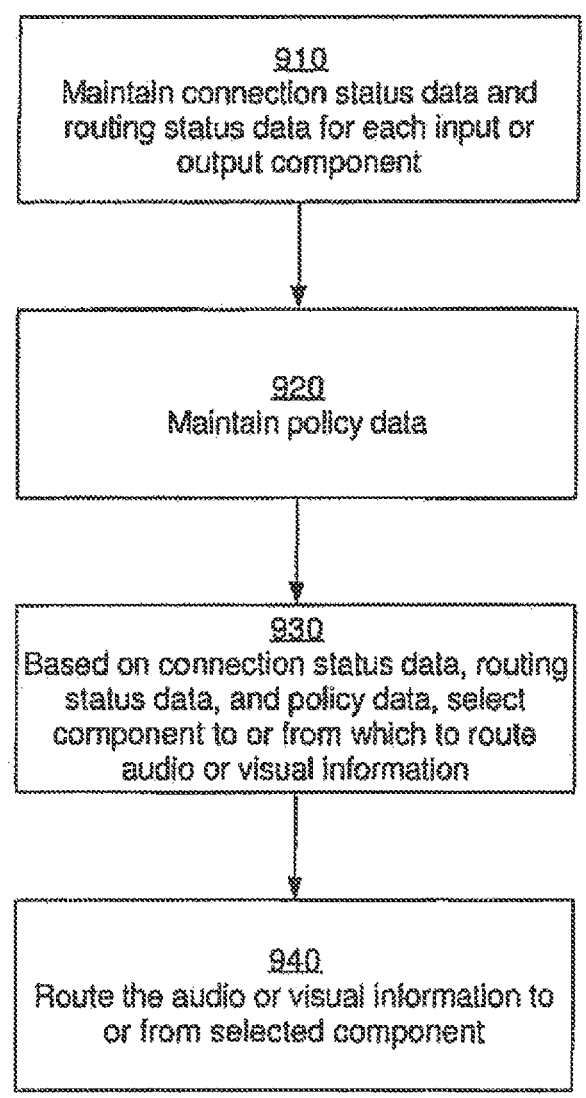
FIG. 9 is an example process flow for routing audiovisual information in an electronic device using routing status, according to an embodiment.

FIG. 9 is an example process flow 900 for routing audiovisual information in an electronic device using routing status, according to an embodiment. Though process flow 900 is depicted as having certain elements occurring in a certain order, other embodiments of the invention may involve similar process flows having more or fewer elements occurring in orders other than that depicted in FIG. 9.

At block 910, a resource manager, such as system 200, executing on a device, such as system 100, maintains status data for each component of a plurality of components. The components are each connectable to an input port of the device, an output port of the device, or to both an input port and an output port of the device. For example, the components may include components 104, 112, 116, 120, or 124 of device 100. The status data includes a) connection status data indicating whether the component is connected to the device; and b) routing status data indicating whether the device is permitted to route audiovisual information through a port of the device to which the component is connected.

At block 920, the resource manager further maintains policy data indicating one or more policies for selecting ports through which the device should route audiovisual information. The policy data may include any data capable of expressing (or being interpreted as expressing) policies such as those described throughout this document. The policy data may include, for instance, various columns within data tables $210_{1-n}$. The policies may be conditioned upon the status data stored in block 910. For example, one policy may be to route telephone calls through any device that is routable. The policies may further be based upon other status data for (or properties of) the connected components, the device, and/or software executing at the device. The policies may further be based upon characteristics of the audiovisual information being presented or received—for example categories or other metadata sent with a request to route the audiovisual information. Such metadata may, for instance, indicate that an audio stream is sampled at a certain frequency or encoded in a certain format. Policies may then be evaluated to determine an appropriate playback component.

At block 930, based at least on (a) the connection status data for one or more components, (b) the routing status data for the one or more components, and (c) the policy data, the resource manager selects one or more ports for routing audiovisual information through the device. For example, the resource manager may evaluate one or more policies conditioned upon the status data to select one or more components. The selection of the one or more components may then implicate one or more ports to which the selected one or more components are connected through techniques such as described elsewhere in this application. The evaluation of the policies may further involve consideration of any other data upon which policies are based, such as explained with respect to block 920. For example, the resource manager may select the "last in" routable component, per the "last in wins" policy.

At block 940, the audiovisual information is routed through the device using the selected one or more ports. In an embodiment, this routing may entail the resource manager identifying the selected port(s) or component(s) and directing a software application to route the requested audiovisual information to or from the selected port(s) or component(s). In an embodiment, this routing may entail the resource manager providing a route for the software application to use in routing the requested audiovisual information. In an embodiment, this routing may entail the software application actually routing the audiovisual information through the resource manager itself, which then assumes responsibility for correctly routing the audiovisual information to or from the selected port(s) or component(s).

Routing Status Upon Connection

Figure 10:
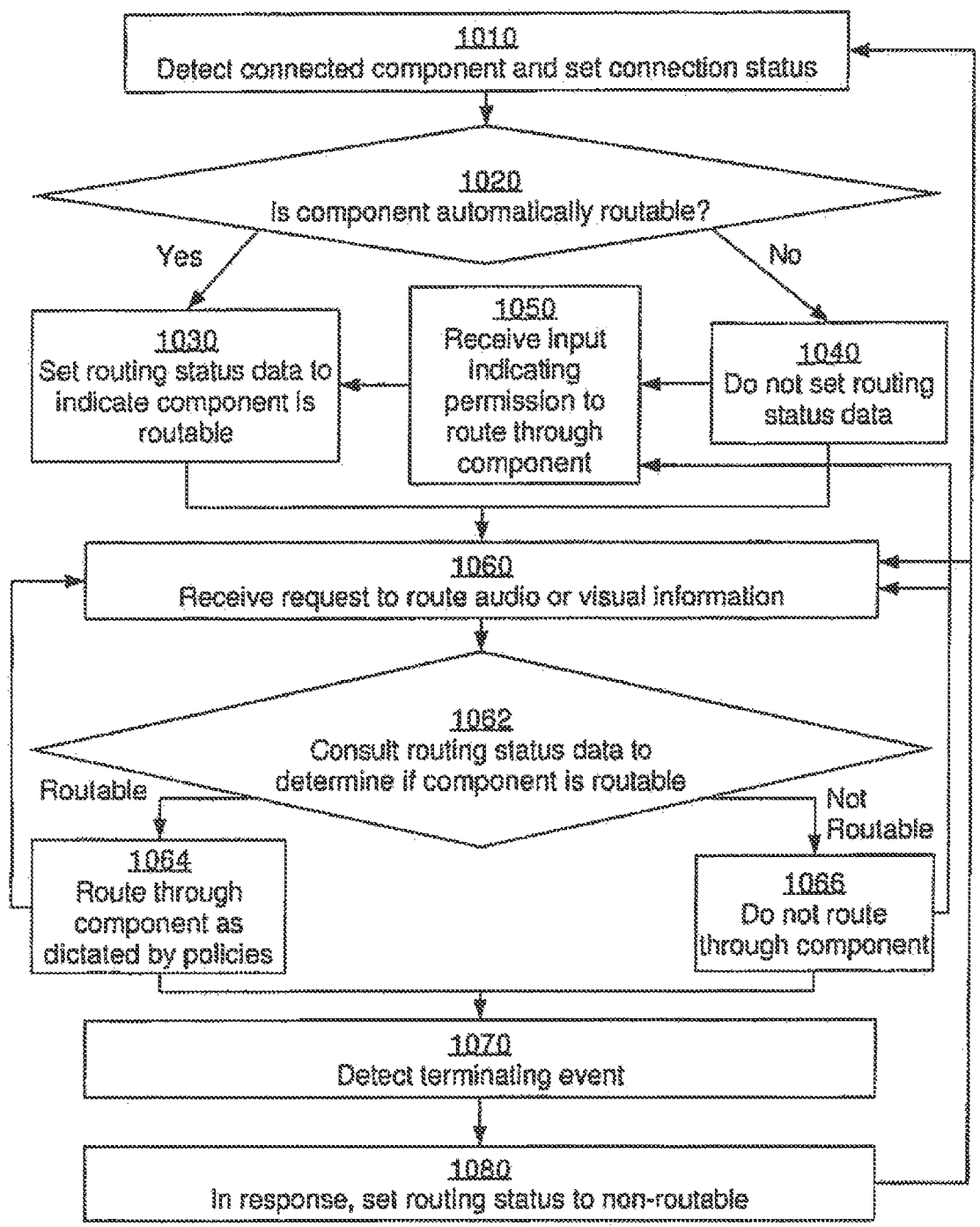
FIG. 10 is an example process flow for handling routing status for resources that connect to an electronic device, according to an embodiment.

FIG. 10 is an example process flow 1000 for handling routing status for resources that connect to an electronic device, according to an embodiment. Though process flow 1000 is depicted as having certain elements occurring in a certain order, other embodiments of the invention may involve similar process flows having more or fewer elements occurring in other orders than that depicted in FIG. 10.

At block 1010, a resource manager for the device detects that an input or output component has connected to the device. For example, a wire may have been plugged into a jack of the device. As another example, a wireless accessory device may have negotiated one or more wireless connections to the device through various protocols. In response to detecting the connection, the resource manager may set connection status data for the component to indicate that the component is connected.

At block 1020, the resource manager determines if the component is automatically routable. In some cases—for example, the first time a component is connected to the device—this determination may be a hard-coded default determination, which may or may not be based on the type or identity of the device. In an embodiment, this determination may be based on policy data, such as maintained in column 816 of table 810. Such policy data may have been configured, for instance, by a hardware vendor, operating system vendor, or user. The policy data may be specific to the component or applicable to certain types of components. In an embodiment, the resource manager further bases the determination on 1) whether or not the device has previously received user input indicating that the device is permitted to route audiovisual information to or from the component, along with 2) data indicating whether or not that input is still valid (i.e. the permission was not expressly or implicitly revoked due to a lost connection or user action).

At block 1030, in response to the resource manager determining that the component is automatically routable, the resource manager sets the routing status data for the component to indicate that the device is permitted to route audiovisual information to or from the component.

Conversely, at block 1040, in response to the resource manager determining that the component is not automatically routable, the resource manager does not modify the routing status data to indicate that the component is routable. In some embodiments, this block may entail the resource manager setting the routing status data to indicate that the component is not routable. In other embodiments, this block may entail the resource manager doing nothing with the routing status data, as the resource manager assumes that the routing status data would have been made "not routable" in step 1080 below if the device were no longer permitted to route data to or from the component.

After block 1040, then, the routing status data for the component will indicate that the device is not permitted to route audiovisual information to or from the component. The process flow may proceed in two different directions from this point. First, the flow may proceed to block 1050, at which block the device detects input indicating that the device is now permitted to route audiovisual information through the component. Such input may result from, for example, the user pressing a button on the device or the component, the user selecting a control in a touch screen interface for managing input or output resources, or a software application on the device issuing a command. Data indicating how long such input remains valid (e.g. instructions to automatically permit the component to route audio or visual information in subsequent connections, or instructions defining the "terminal event" of step 1070) may further be stored in accordance with instructions from a user or as dictated by one or more policies. The input of block 1050 may also have occurred prior to the connection of block 1010—for example, the user may have provided such input during a previous connection along with implicit or explicit instructions to remember that input for subsequent connections. In response to this input, the flow may proceed to block 1030.

On the other hand, after block 1040, the resource manager may, at block 1060, receive a request to determine a route for certain audiovisual information. Block 1060 may also be performed at any time after block 1030. The resource manager may receive this request, for example, from software executing at the device.

At block 1062, the resource manager may consult the connection status data and the routing status data to determine which components are connected and routable. At block 1064, if the routing status data indicates that the device is permitted to route audiovisual information to or from the component whose connection to the device was detected in block 1010, then the device routes the audiovisual information through the component (assuming no other policies indicate that another component—for an example, a component connected after block 1010—has a higher priority). Otherwise, at block 1066, the device routes the audiovisual information through a component other than the component whose connection to the device was detected in block 1010.

In an embodiment, the request of block 1060 may include instructions to explicitly override any other policies that would normally be considered. In view of such override instructions, the component will always be selected should the flow reach block 1064. In an embodiment, the request of 1060 may include override instructions for only certain policies.

From block 1064 or 1066, flow may return to block 1060. Furthermore, from block 1066, flow may also proceed to block 1050, so that the component finally becomes routable. Finally, from block 1064 or 1066, flow may proceed to block 1070.

At block 1070, the device may detect a terminating event indicating that the device is no longer permitted to route audiovisual information to or from the component. Terminating events may be hard-coded and/or specified by device-specific, type-specific, or generic policies. Terminating events may include, for instance, a lost connection, power cycling at the component or the device, or any type of input. In an embodiment, policies for defining terminating events may be evaluated any time certain events occur, so as to determine whether or not the event is actually a terminating event.

In response to a terminating event, at block 1080, the resource manager may set the routing status data to indicate that the device is not permitted to route audiovisual information to or from the component. Additionally, if the terminating event was a terminated connection, the connection status data may also be set to indicate that the component is no longer connected. From block 1080, flow may then proceed to blocks 1010 or 1060.

In an embodiment, a connection may be terminated prior to 1070, at which point the connection status data is set to indicate that the component is no longer connected. However, the termination of the connection may not be defined as a terminating event for routing purposes, so that upon subsequent connections, the component may already be indicated as routable.

3.9. Grouping Components

According to an embodiment, a resource manager such as system 200 may maintain "grouping" data indicating logical relationships between various input or output components connected to a device. A used herein, the term "logical relationships" refers to relationships wherein the use or management of one component has implications on the use or management of another component.

FIG. 11 depicts an example table 1110 for storing policy and grouping data, according to an embodiment. Table 1110 is another example of a possible table $210_{1-n}$. Table 1110 includes status data for six different components, including an instantiation of the A2DP bluetooth profile 1111, an instantiation of the HFP bluetooth profile 1112, a bluetooth microphone 1113, a built-in speaker 1114, an external microphone 1115, and an external speaker 1116. As with any of the example tables described herein, table 1110 may include more or fewer rows than depicted, depending on the number of input or output components connected to the device. Table 1110 may also include more or fewer columns depending upon the policies and grouping relationships supported by the device. For example, table 1110 may include any column of information from any other example table described herein. Moreover, relationship data may be stored in manners other than that depicted—for example, a single column may be used to store comma-separated lists of relationships. Or, relationships may be identified in table 1110 by group or accessory device names instead of a list of other components in the relationship.

Table 1110 includes columns 1122 and 1124 for maintaining grouping data indicating logical relationships between devices. In this case, columns 1122 and 1124 indicate "sibling" and "partner" relationships, respectively. A sibling relationship identifies a group of components that have complementary purposes, and therefore will likely be utilized together. For example, HFP component 1112 and bluetooth microphone 1113 may both be logical components of the same bluetooth headset, and therefore would most likely be used together. As another example, the external microphone 1115 and an external speaker 1116, although components of a different accessory device, may be grouped together as siblings to indicate that the components should be used in tandem. Many other sibling relationships are also possible. For example, a number of different outputs that are typically used concurrently—either for broadcasting the same audiovisual information, or for separately presenting different categories of audiovisual information—may be grouped together.

A partner relationship identifies a group of components that have mutually exclusive purposes, in that one of the components cannot be used at the same time as the other component. According to an embodiment, partners are components with conflicting purposes at the same accessory device. For example, HFP profile 1112 and A2DP profile 1111 both are used to output audio at the same bluetooth device. Since audio may be output via only one of the profiles at any given time, HFP profile 1112 and A2DP profile 1111 are considered partners.

The determination to group components may be hard-coded or dictated by policy. For example, the input and output components of any accessory device that has both an input or output component may automatically be grouped as siblings. Competing output resources at the same accessory device may automatically be grouped as partners. The determination to group components may furthermore be based on certain component characteristics, such as profiles supported by the component. The determination may also be based on data indicating historical usage trends. Components themselves may announce grouping preferences. Grouping policies may be configured by a user or vendor.

Example Uses of Grouping Data

Grouping data may be used for a variety of purposes, some of which are herein described. One such purpose is to simplify resource management interfaces for the user. Rather than present controls for each component of a group, controls may instead be presented for the entire group. Through such an interface, for example, the resource manager may receive an indication that the device is permitted to route audio through an accessory device, such as a bluetooth headset. In response to this indication, the resource manager may consult the grouping data to identify components of the accessory device. The resource manager may then store, for each of the identified components of the accessory device, data indicating that the device is permitted to route audiovisual information through the component. This same strategy may be utilized to control any setting common to the entire group, including volume and connection status. Furthermore, the device may expose interfaces to applications that allow for sending instructions that are applicable to a group of components, or for receiving status data collectively from the group of components.

As another example use of grouping data, policies may be designed to identify a group for routing audiovisual information instead of an individual component. For example, one policy may be to always route audio through a bluetooth headset whenever the bluetooth headset is connected. However, the bluetooth headset may feature a number of grouped components. Once the decision has been made to route audio through the bluetooth headset, other policies may be evaluated to identify exactly which components of the bluetooth headset should be utilized. For example, priority data for each member of a selected group, such as stored in columns 1126 and 1132-1136, may be consulted to identify a specific component from that group to or from which to route the audiovisual information.

As another example use of grouping data, when the resource manager has already made a decision to route a first audiovisual stream through a first component, the resource manager may utilize grouping data to determine how to concurrently route a second audiovisual stream. For example, the device may already be outputting sound for a telephone call to HFP component 1112. The resource manager, in determining how to route incoming sound for the telephone call, may consult sibling data for the HFP component 1112 to determine from which component it should route the incoming sound. Thus, the resource manager may route sound from bluetooth microphone 1113. In some embodiments, the resource manager may make this decision even if the policy data would otherwise indicate that another input component should have higher priority. Similarly, partner data may be consulted to ensure that audiovisual information is not routed through a component that cannot be utilized simultaneously with another component already in use.

Overriding "Last in Wins" Priority

As discussed above, table 1110 further includes columns 1126 and 1132-1136 for maintaining priority data. The priority data is, in one sense, a subset of the policy data, in that it indicates priority policies in various contexts. Data in column 1126 indicates a "last in wins" hierarchical listing of components, as discussed in previous sections. By this listing, in many cases, the resource manager may determine which component(s) currently have priority for routing.

In some embodiments, exceptions to the "last in wins" policy may occur when the component with highest priority belongs to a group. If the resource manager determines that the highest priority component belongs to a group, the resource manager will treat the component's group—as opposed to the individual component—as having the highest priority. The resource manager will then employ various tie-breaking mechanisms to determine which component in the group should have highest priority. For example, the resource manager may consult secondary priority information, such as contained in the category-specific priority ranking columns 1132-1136 of table 1110, to determine a component to or from which to route the audiovisual information.

In an embodiment, the resource manager may detect that components a and b can be used to route certain audiovisual information. The resource manager may then determine whether component a is related to component b. If component a is not related to b, then the resource manager may select the most recently connected of components a and b. If components a and b are related, then the resource manager may choose between components a and b based on one or more factors other than the relative connection times of components a and b.

Overriding a "last in wins" policy may be useful, for example, in embodiments where different components of an accessory device connect at different times. For example, many bluetooth devices establish connections through different protocols in an unpredictable serial manner instead of simultaneously. For instance, a bluetooth device may first establish an A2DP connection and then establish a HFP connection. Since the HFP connection would technically be considered the "last in" component, the "last in win" policy would dictate that music should be streamed through the HFP connection, even though the A2DP connection may in fact be better suited to play back music. Thus, it is more desirable to treat both the A2DP component and the HFP component as a group of components that connected simultaneously, and to thus resort to other policies for determining priority.

Example Process Flow for Maintaining Grouping Data

Figure 12:
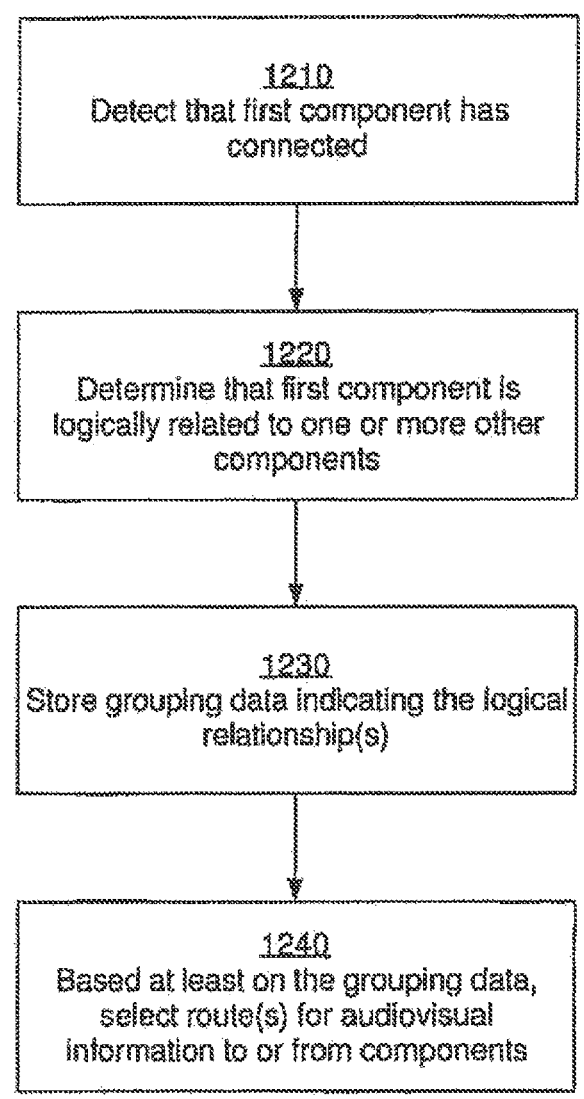
FIG. 12 is an example process flow for handling routing status for resources that connect to an electronic device, according to an embodiment.

FIG. 12 is an example process flow 1200 for handling routing status for resources that connect to an electronic device, according to an embodiment. Though process flow 1200 is depicted as having certain elements occurring in a certain order, other embodiments of the invention may involve similar process flows having more or fewer elements occurring in other orders than that depicted in FIG. 12.

At block 1210, a first component connects to the device.

At block 1220, a resource manager executing on the device determines that the first component is logically related to one or more other components that are or have previously connected to the device. Block 1220 may occur as part of an evaluation of hard-coded or data-driven policies. The resource manager may routinely perform this evaluation at certain intervals or in response to the connection of any component. Moreover, this evaluation may have been performed previous to block 1210 while the first component and the one or more other components were previously connected to the device.

At block 1230, in response to determining that the first component is logically related to the one or more other components, the resource manager stores grouping data specifying a relationship between the first component and the one or more other components. This data may be stored in, for example, a database table such as table 1110, or in any other form.

At block 1240, based at least on the grouping data, the resource manager selects one or more ports for routing the audiovisual information through the device. In an embodiment, this block may entail evaluating any number of policies conditioned upon the grouping data, such as the priority policies. In an embodiment, this block may entail receiving input from a user that specifies configuration settings for a certain group (as opposed to individual components of a group) indicated in the grouping data, which settings in turn affect policies for identifying routes.

4.0. Implementation Examples 4.1. Example Audio Routing Infrastructure

FIG. 6 shows an example audio infrastructure 600, according to an embodiment. Although data tables $210_{1-n}$ may contain various suggested routes for a specific category, these suggested routes remain in abstract (uncommitted) format until the port (node) manager 608 can verify that the various routes, connections and nodes are truly available.

Accordingly, the audio infrastructure 600 works as follows. The audio routing manager 212 receives notification that an audio event has occurred and determines the category for the event. The audio routing manager reviews a prioritized list of routes associated with that category, Such a list may be held, for example, in the data tables $210_{1-n}$. As shown in FIG. 6, the routing manager sends an abstract route to the port manager. The port manager 608 then returns a concrete (verified) route to the audio routing manager 212. The audio routing manager 212 then passes the route to the routing handler 612, which implements the route.

For a given category, numerous audio routes may be contained within data tables $210_{1-n}$. However, these routes are abstract (potentially workable but not hardware-verified) until the routes can be verified and affirmed by a combination of the port manager 608 and routing handler 612. Abstract routes contain identifiers describing generic node types (e.g. speaker, headphones, wireless headset, etc.) whereas concrete routes contain objects describing particular nodes, e.g. Acme Bluetooth headset Model XYZ.

Thus, the inclusion of a route within the data tables $210_{1-n}$, does not necessarily imply that at a given time that specific route is usable. The status of any particular route may change depending on usage of the device 100. Port manager 608 is therefore utilized to determine whether a route is truly available (i.e. hardware-verified or concrete), and then pass a concrete route back to the audio routing manager 212. The audio routing manager 212 may also or instead consult data tables $210_{1-n}$ and need not rely solely on the port manager 608.

There may be circumstances in which a route, connection, and/or node appears to audio routing manager 212 to be available, but in fact is not available. One such circumstance may be a hardware failure. Accordingly, the audio routing manager 212 may depend on the port manager 608 and routing handler 612 to verify that a route can in fact be implemented.

Where a route is found to be concrete, the port manager 608 instantiates an object that corresponds to the ports identified in the abstract routes. The routing manager 212 passes that concrete route to the routing handler 612. The routing handler 612 then makes calls to the objects that were instantiated by port manager 608, and in so doing communicates directly with ports within the device 100 to see whether the proposed route connections are in fact achievable. If the answer is that the ports in the current route are useable, the routing handler 612 establishes the specified route or routes, mutes all other routes, and returns a "success" back to the routing manager 212. If the answer is 'no', the routing handler 612 returns data indicating a failure, and audio routing manager 212 attempts to evaluate the next route in the priority-ranked list.

As stated, the audio routing manager 212 may sometimes be mistaken about whether a route is truly achievable. For example, the device 100 may be bumped or dropped, a hardware error may occur, or the user may make a sudden configuration change. Rather than force the audio routing manager 212 to track all this ever-changing status of hardware within the device 100, this information may be verified real-time on an as-needed basis by the port manager 608 and routing handler 612. Thus, in an embodiment, the actual availability of specific nodes within the device 100 is decoupled from the knowledge of the audio routing manager 212, so as to ensure that routing manager 212 is not responsible for awareness of availability of specific nodes.

Acting on route properties does not occur until the routing handler 612 determines that the route can be established.

Once the route is established, the routing handler 612 then configures the route as indicated by various properties. This may include, for example, setting up volume levels, volume curves, and mixing levels, and so on.

Port manager 608 may inform the routing manager that no concrete routes are available. All three of routing manager 212, port manager 608, and routing handler 612 are free to consult database 210 and make use of the various properties contained therein.

Returning to FIG. 4, for a particular route, all connections may be stored in the data tables $210_{1-n}$. After the above determination and verification of a concrete route, the various unwanted connections are muted, but the routes still exist. At a code level, storing and managing the status of all audio intermediaries increases the amount of processing and complicates the data tables $210_{1-n}$. Thus, in some embodiments it may be easier to mask the unwanted routes than to continually rebuild/reconstruct new routes every time an event occurs. However, other embodiments may continually rebuild/reconstruct new routes every time an event occurs.

Example Operation of Routing Infrastructure

As stated in previous sections, the data tables 2101-$n$ may hold lists of routes for specific categories, ranked in order of route priority. FIG. 7 shows ranked routing priority lists for two example audio categories, according to an embodiment. The categories include "audio soundtrack of video," and "voice telephone call." When an event of either of these categories occurs, the audio routing manager 212 cycles through the various routes associated with that event, as stored in the data tables 2101-$n$. Using the first example from FIG. 6, the audio routing manager 212 will select route 1, and pass that route 1 to the port manager 608 in an abstract format, as shown in FIG. 6. The audio routing manager 212 may be informed by either the port manager 608 or routing handler 612 that route 1 is not available. A route may be unavailable for a variety of reasons, one of which is that a connection or node within that route is occupied with some other task, or is failing. Supposing route 1 is unavailable, the audio routing manager 212 would then cycle to route 2, for example, and then re-inquire to the port manager 608 and the routing handler 612.

4.2. Properties

According to an embodiment, various types of metadata associated with routes, connection, and nodes may also be stored within data tables $210_{1-n}$ as route properties, connection properties, and node properties, respectively. Changing the properties of a specific route may result in changes to the properties of all connections and nodes within that route, but only to the extent those connections and nodes participate in that route. Those same connections and nodes may have different properties for when they participate in a different route. Returning to FIG. 5, a speaker identifier is shown, having an automatic gain control (AGC) property. The property associated with the speaker identifier indicates that when that particular connection is used, a particular amount of automatic gain control should be applied to the speaker. FIG. 5 also shows numerous examples of ellipses signifying that connections and routes may also have properties.

A property is data that indicates something about an entity, where the entity is a node, connection, or route. Property data may, for example, indicate parameters for an audio effect, or information that affects whether the entity is mandatory. The following is a list of example properties. The list is by no means exhaustive.

A first property may indicate a per-connection mixing leveling, which allows a specification of fixed gain levels to be applied prior to the point at which multiple connections are mixed. One example effect of this property may occur when a user is participating in a voice telephone call while playing music. The per-connection mix level property may be used to attenuate the music but leave the call volume unaltered.

Another property may indicate per-node, per-connection, or per-route volume caps. Potential purposes for such a property may include hearing-protection for a user or volume balancing to keep volumes consistent across various output ports.

Another property may indicate per-node, per-connection, or per-route volume curve specifications associated with connection mix levels. System 200 may direct specific audio processors to drop the volume of a particular audio signal before that signal reaches any further nodes. If two connections are at different gain levels, one or the other may be leveled before the two connections are mixed, perhaps by the routing manager 212, although some other component may also perform this task. Volume slider interfaces for allowing a user to change this property may be linear, logarithmic, exponential, or on some other scale. Such a feature may be useful for tweaking volume curves at a fine level of control to enable hardware compensation.

Another property may indicate per-node, per-connection, or per-route digital signal processing (DSP) effects, such as equalization (EQ), dynamic range compression (DRC), automatic gain control (AGC). These effects may be applied selectively. This property may be valuable if, for example, device 100 uses speakers or microphones with limited ranges or uneven frequency responses.

Another property may indicate per-connection optionality for broadcast routes. As noted earlier, the routing manager 212 passes abstract routes to the port manager 608, which determines whether various nodes are properly connected. If a route is designated as optional within the data tables $210_{1-n}$, and part of that route is not present or available, that route is muted, and never becomes concrete. If a route property is optional, when the audio routing manager 212 cycles through the various routes, it checks the condition upon which the designation of optionality is based. If the condition fails, the audio routing manager 212 de-activates the route and does not further consider it. For example, the system 200 may want to broadcast a ringtone to several places. Suppose that a policy exists to broadcast only high quality ringtones. In such a case, system 200 would only consider those ports that provide high sample rates, so that connections for those ports could be considered optional under the condition that they supports a minimum sample rate.

Another property may indicate per-port, per-connection, or per-route hints about what to do when encountering specifically identified audio processors. For example, if an audio processor has a weak dynamic range (e.g. −10 db to 0 db), a route incorporating that audio processor may contain a "hint" disqualifying that audio processor from being used in a certain route where outstanding dynamic range is required. Such hints are stored in the database $210_{1-n}$. A hint is a type of property used to help make a routing decision in the face of ambiguity. For example, if there are two bluetooth headsets available, a hint may exist to choose the one that has a larger dynamic range, so the hint would be "large dynamic range preferred". These hints can be evaluated for example by the port manager 608.

Another property may be an index of an audio processor's properties within the data tables $210_{1-n}$, so as to allow determination of more complex behavior within code or scripting languages. For example, data tables $210_{1-n}$ may store an identifier in the form of a character string, which is used to specifically identify an audio processor. This feature may not be exposed to users. It may possible to identify a particular port and distinguish it from other ports of the same type. For example, there might be three bluetooth headsets paired with a phone that each provide a unique identifier (UID). The data tables $210_{1-n}$ can store information that is specific to a particular port via UID, and use that information drive policy decisions. One example may be to keep track of how reliable a particular port is. If a particular BlueTooth headset is known to frequently drop calls, that headset can be marked as "bad" within the data tables $210_{1-n}$, and cause the system 200 to present a dialog to the user that there may be a problem with that particular headset.

Another property may indicate user configurations stored directly in data tables $210_{1-n}$. For example, a user may have odd or unusual preferences counter-intuitive to or not anticipated by the designers of the system 200.

Another property may indicate per-connection or per-route echo cancellation/noise reduction settings. In addition to facilitating echo cancellation/noise reduction, this property may be used, for example, in decisions by the audio routing manager 212 allow or disallow a route".

Another property may indicate per-port, per-connection, or per-route preconditions and postconditions, such as minimum dynamic range, or necessity of volume control. For example, a particular port may require a minimum dynamic range. If the specified minimum dynamic range cannot be reached, the audio routing manager 212 will "fail" the route or compensate somehow, perhaps by forcing other audio processors to adjust. This behavior may ensure, for example, that the nodes and connections sufficiently satisfy a given set of criteria (conditions).

Another property may indicate per-category prevention of screen dimming or auto lock. Such a property may be useful for video or game categories. A specific video-related route may have a property indicates whether or not it supports screen-dimming or auto-locking. This property may then be used to determine whether or not screen-dimming or auto-locking policies may be applied to the route.

4.3. Aliasing

System 200 may also accommodate per-category aliasing of route lists. As discussed in previous sections, route lists are priority-ranked in data tables $210_{1-n}$. If a route list is already known and established—in other words, if all of the work and effort of setting up a route list has already been performed—that route-list may be named and referenced by an alias. Using the name of an existing route list avoids the need to duplicate data, because each route list may have numerous properties associated therewith. Also, if it is necessary to change some properties of a single route-list, all routes with that alias may be effectively changed at once just by pointing the alias to another route. Aliasing may be performed on a per-category, per-port, per-connection, per-node, per device, or per route basis.

4.4. Fall Back

Another property may indicate per-category route list fallback logic, which is used if a specific category somehow fails unexpectedly. System 200 may instead fall back to some other category. For example, an audio stream may be in a "music" category. The system may cycle through all available routes in the route list for that category, as suggested by FIG. 6. If all routes in a specific category fail, then none of the routes for that category develop even into abstract format. The system 200 will note that something is clearly wrong within device 100. But, on account to a fallback preference indicated by the fallback property, the system 200 may still recover by resorting to playback in a different category, such as "audio soundtrack". The system 200 would then cycle the routes in the fallback category.

5.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
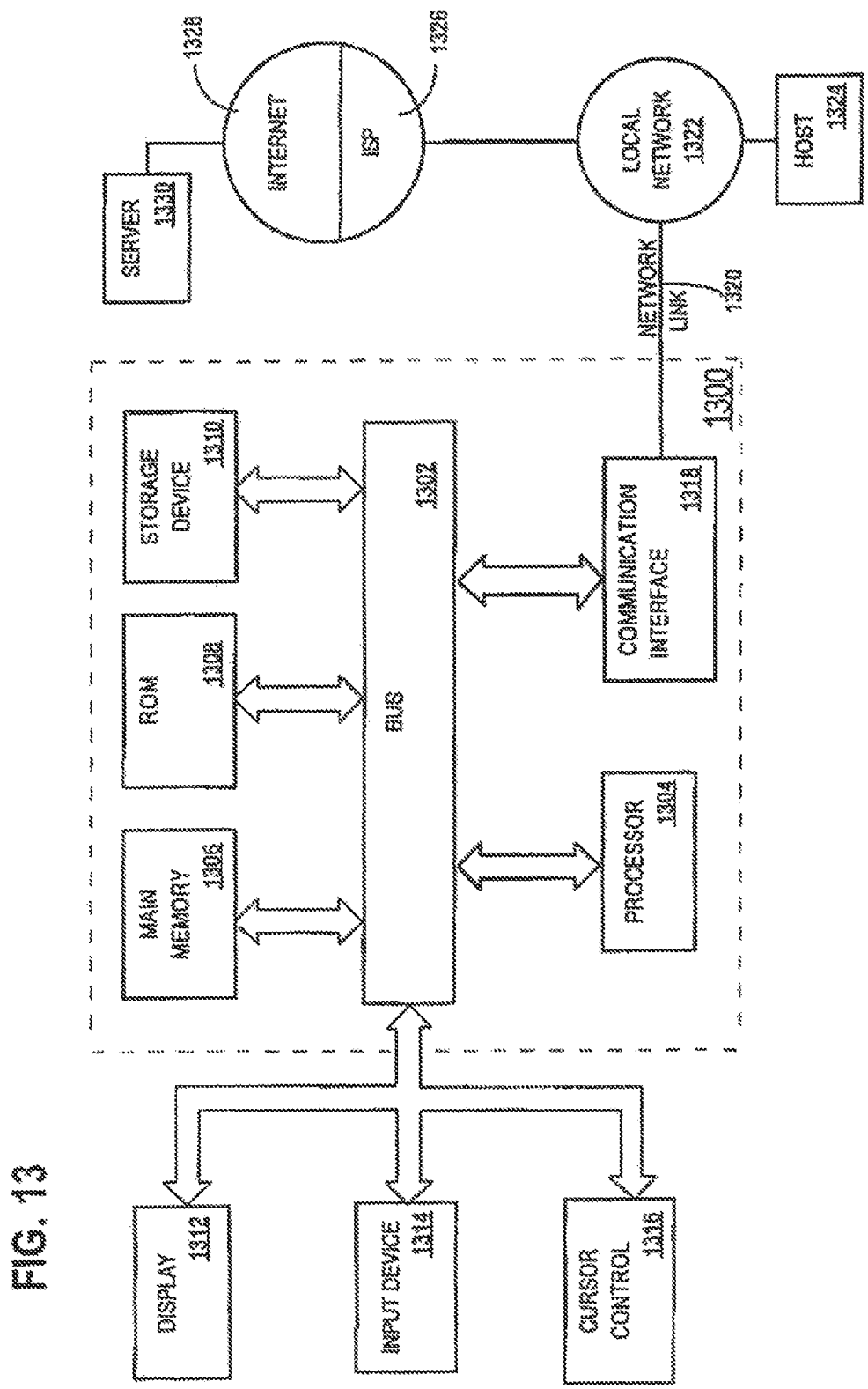
FIG. 13 is block diagram of a computer system upon which embodiments of the invention may be implemented.

For example, FIG. 13 is a block diagram that illustrates a computer system 1300 upon which an embodiment may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

6.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for routing audio performed by a computing device, the method comprising:
   maintaining, by a computing device, grouping data specifying a relationship between an external microphone and an external speaker through which the computing device is to route audio;
   receiving, at the computing device, a request from a software application for audio input or audio output;
   in response to the request, the computing device:
      identifying a relationship between the external microphone and the external speaker based on the grouping data; and
      routing audio input from the external microphone to the software application, and
      routing audio output from the software application through the external speaker.

2. The method of claim 1, further comprising:
   receiving a selection which indicates that the computing device is permitted to route audio to or from an accessory device;
   in response to receiving the selection indicating that the computing device is permitted to route audio to or from the accessory device, identifying that the external microphone and the external speaker are associated with the accessory device based on the grouping data; and storing, on the computing device, data indicating the computing device is permitted to route audio through the accessory device for the external microphone and the external speaker.

3. The method of claim 2 wherein the external microphone is a microphone of a single headset, and the external speaker is an earphone of the single headset.

4. The method of claim 1 wherein the external microphone is a microphone of a single headset, and the external speaker is an earphone of the single headset.

5. The method of claim 4 wherein when making routing decisions, the external speaker is made routable in response to the external microphone being made routable.

6. The method of claim 1 further comprising
presenting a control interface not for each of the external microphone and the external speaker but instead for a group that includes the external microphone and the external speaker;
receiving an indication through the control interface that the computing device is permitted to route audio through an accessory device, and
in response to the indication, consulting the grouping data to identify a plurality of components of the accessory device, and store, for each of the identified components of the accessory device, data indicating that the computing device is permitted to route audio or video through the component.

7. The method of claim 6 further comprising consulting the grouping data to identify a setting common to the group as a whole, wherein the setting is one of volume or connection status.

8. The method of claim 6 further comprising
exposing a further control interface to software applications, wherein the further control interface is to be used to send instructions that are applicable to a group of components, or receive status data collectively from the group of components.

9. The method of claim 1, further comprising:
based at least on data that indicates that the external speaker and the external microphone are sibling components, determining to route a first stream through a first port to which the external speaker is connected, and a second stream through a second port to which the external microphone is connected,
wherein the second stream is routed concurrently with the first stream.

10. A computing device for routing audio comprising:
a processor; and
memory have stored therein instructions that when executed by the processor
maintain grouping data specifying a relationship between an external microphone and an external speaker through which the computing device is to route audio,
receive a request from a software application for audio input or audio output,
in response to the request, identify a relationship between the external microphone and the external speaker based on the grouping data, and
route audio input from the external microphone to the software application, and route audio output from the software application through the external speaker.

11. The computing device of claim 10 wherein the memory has stored instructions that when executed by the processor:
receive a selection which indicates that the computing device is permitted to route audio to or from an accessory device;
in response to receiving the selection indicate that the computing device is permitted to route audio to or from the accessory device, identifying that the external microphone and the external speaker are associated with the accessory device based on the grouping data; and
store, on the computing device, data indicating the computing device is permitted to route audio through the accessory device for the external microphone and the external speaker.

12. The computing device of claim 11 wherein the external microphone is a microphone of a single headset, and the external speaker is an earphone of the single headset.

13. The computing device of claim 10 wherein the external microphone is a microphone of a single headset, and the external speaker is an earphone of the single headset.

14. The computing device of claim 13 wherein when making routing decisions, the external speaker is made routable in response to the external microphone being made routable.

15. The computing device of claim 10 wherein the memory has stored therein instructions that when executed by the processor:
present a control interface not for each of the external microphone and the external speaker but instead for a group that includes the external microphone and the external speaker;
receive an indication through the control interface that the computing device is permitted to route audio through an accessory device, and
in response to the indication, access the grouping data to identify a plurality of components of the accessory device, and store, for each of the identified components of the accessory device, data indicating that the computing device is permitted to route audio or video through the component.

16. The computing device of claim 15 wherein the processor is to access the grouping data to identify a setting common to the group as a whole, wherein the setting is one of volume or connection status.

17. The computing device of claim 15 wherein the memory has instructions stored therein that when executed by the processor
expose a further control interface to software applications, wherein the further control interface is to be used to send instructions that are applicable to a group of components, or receive status data collectively from the group of components.

18. The computing device of claim 10 wherein the memory has instructions stored therein that when executed by the processor
determine to route a first stream through a first port to which the external speaker is connected, and a second stream through a second port to which the external microphone is connected, based at least on data that indicates that the external speaker and the external microphone are sibling components, wherein the second stream is to be routed concurrently with the first stream.

* * * * *